(12) United States Patent
May et al.

(10) Patent No.: US 8,578,682 B2
(45) Date of Patent: *Nov. 12, 2013

(54) ROTATING MULTI-CLIPPER PACKAGING SYSTEMS

(75) Inventors: Dennis J. May, Pittsboro, NC (US); Samuel D. Griggs, Raleigh, NC (US); Matthew D. Lowder, Durham, NC (US); Thomas E. Whittlesey, Apex, NC (US); William M. Poteat, Fuquay-Varina, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,226

(22) Filed: Aug. 27, 2012

(65) Prior Publication Data

US 2012/0311964 A1 Dec. 13, 2012

Related U.S. Application Data

(63) Continuation of application No. 13/192,637, filed on Jul. 28, 2011, now Pat. No. 8,272,191, which is a continuation of application No. 12/338,137, filed on Dec. 18, 2008, now Pat. No. 8,006,463.

(60) Provisional application No. 61/015,067, filed on Dec. 19, 2007.

(51) Int. Cl.
*B65B 51/04* (2006.01)
*A22C 11/12* (2006.01)

(52) U.S. Cl.
USPC ............... 53/138.4; 53/567; 53/576; 452/48

(58) Field of Classification Search
CPC ...... B65B 59/04; B65B 51/04; A22C 11/108; A22C 11/125
USPC ......... 53/417, 138.1–138.4, 567, 576; 452/48
See application file for complete search history.

(56) References Cited

U.S. PATENT DOCUMENTS

| | | | |
|---|---|---|---|
| 2,002,889 | A | 5/1935 | Geer et al. |
| 2,663,982 | A | 12/1953 | Conti |
| 3,714,754 | A | 2/1973 | Holcombe et al. |
| 3,795,085 | A | 3/1974 | Andre et al. |
| 3,818,574 | A | 6/1974 | Reid et al. |
| 4,043,011 | A | 8/1977 | Giraudi et al. |
| 4,305,240 | A | 12/1981 | Grevich et al. |
| 4,561,583 | A | 12/1985 | Niedecker |

(Continued)

FOREIGN PATENT DOCUMENTS

| | | |
|---|---|---|
| GB | 631128 | 10/1949 |
| GB | 2039793 | 8/1980 |

OTHER PUBLICATIONS

High Speed Explosives Packaging Rota-Clip, Product Advertisement, Tipper Tie, Inc., © 2006, 2 pages.

(Continued)

*Primary Examiner* — Stephen F Gerrity
(74) *Attorney, Agent, or Firm* — Meyer Bigel Sibley & Sajovec, P.A.

(57) ABSTRACT

Apparatus, systems, devices, methods and computer program products configured to provide one or more of the following: improved rotary table or platform packaging systems, improved adhesive (glue) based film seal systems, and/or easier loading or releasing mounting systems of horns, forming collars and/or sprockets.

25 Claims, 29 Drawing Sheets

(56) References Cited

U.S. PATENT DOCUMENTS

| | | |
|---|---|---|
| 4,675,945 A | 6/1987 | Evans et al. |
| 4,821,485 A | 4/1989 | Evans et al. |
| 4,991,260 A | 2/1991 | Nausedas |
| 5,020,298 A | 6/1991 | Evans et al. |
| 5,085,036 A | 2/1992 | Evans et al. |
| 5,203,760 A | 4/1993 | Chen et al. |
| 5,259,168 A | 11/1993 | Evans et al. |
| 5,336,349 A | 8/1994 | Cornils et al. |
| 5,471,815 A | 12/1995 | Evans et al. |
| 5,605,720 A | 2/1997 | Allen et al. |
| 5,644,896 A | 7/1997 | Evans et al. |
| 6,153,860 A | 11/2000 | Weng |
| 7,059,102 B2 | 6/2006 | Hanten |
| 7,475,521 B2 | 1/2009 | Topfer |
| 8,006,463 B2 | 8/2011 | May et al. |
| 8,272,191 B2 * | 9/2012 | May et al. .................... 53/138.4 |
| 2002/0167103 A1 | 11/2002 | Ickinger |
| 2004/0043121 A1 | 3/2004 | Shefet |
| 2005/0053699 A1 | 3/2005 | Whittlesey et al. |
| 2006/0068113 A1 | 3/2006 | Aoyama et al. |
| 2006/0104675 A1 | 5/2006 | Dudek et al. |
| 2007/0011990 A1 | 1/2007 | Ebert |

OTHER PUBLICATIONS

Chub Packaging Machinery, Product Advertisement, Packaging Technologies KartridgPak Packaging and Processing Systems, © 2000, 4 pages.

International Search Report and Written Opinion of PCT application No. PCT/US2008/013855, mailing date Feb. 24, 2009, 16 pages.

* cited by examiner

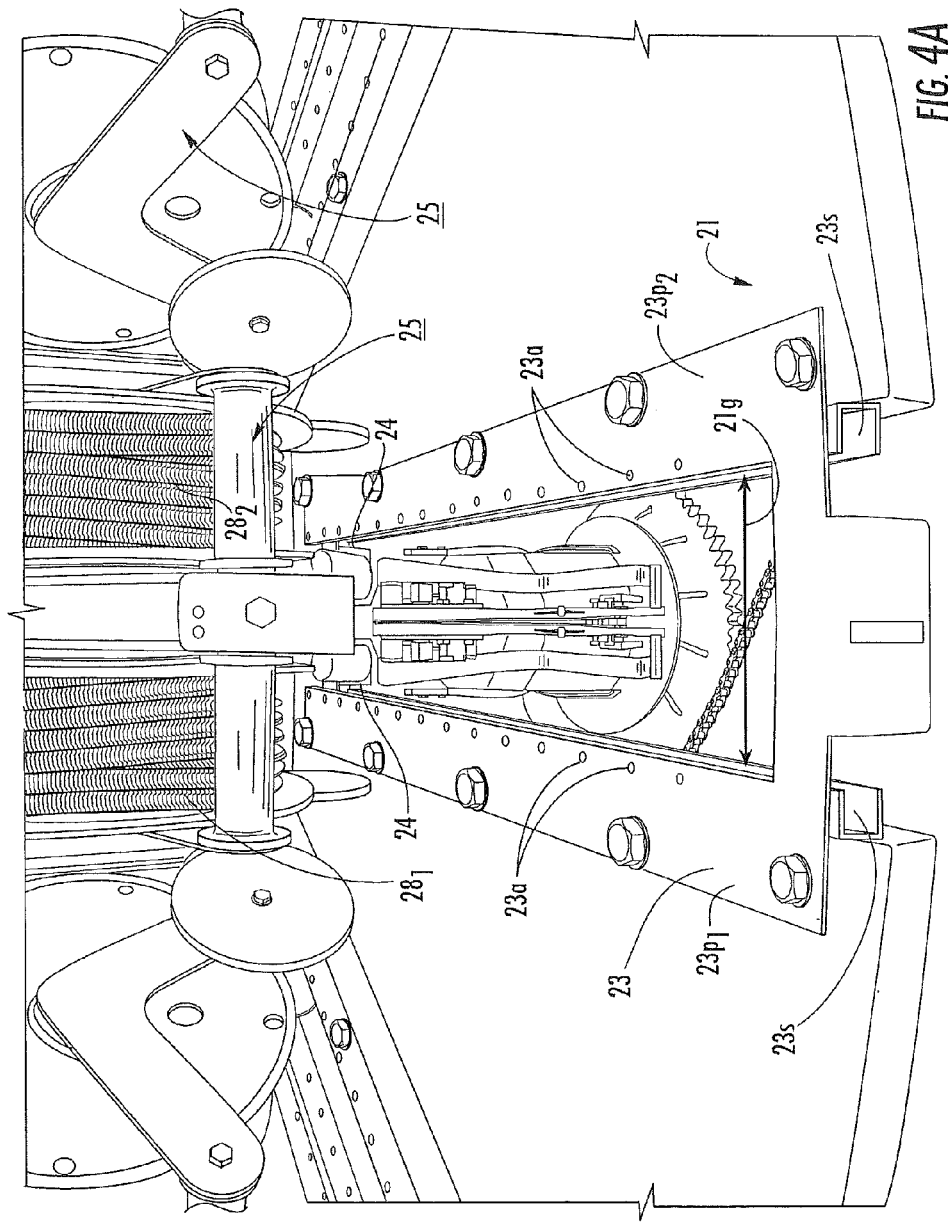

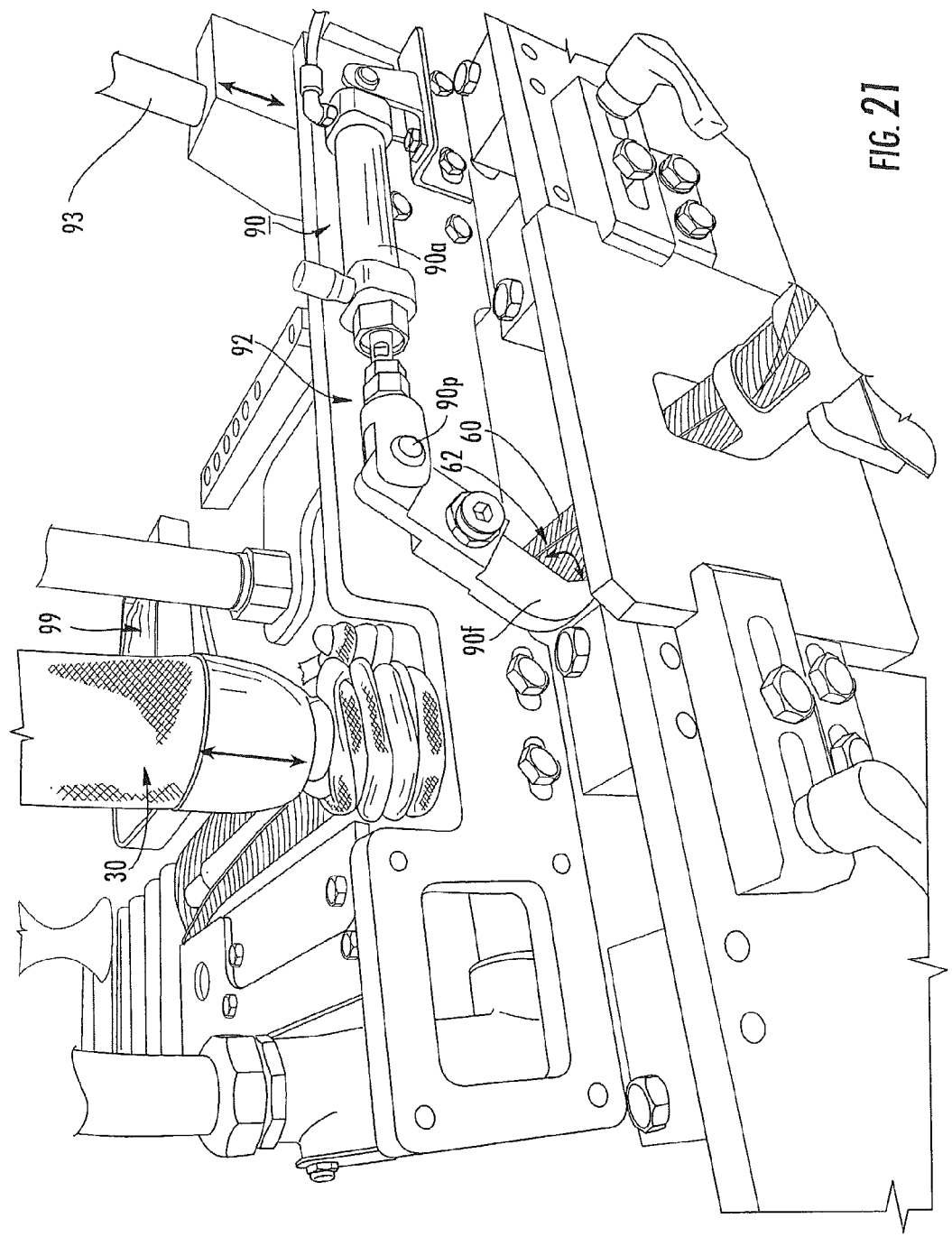

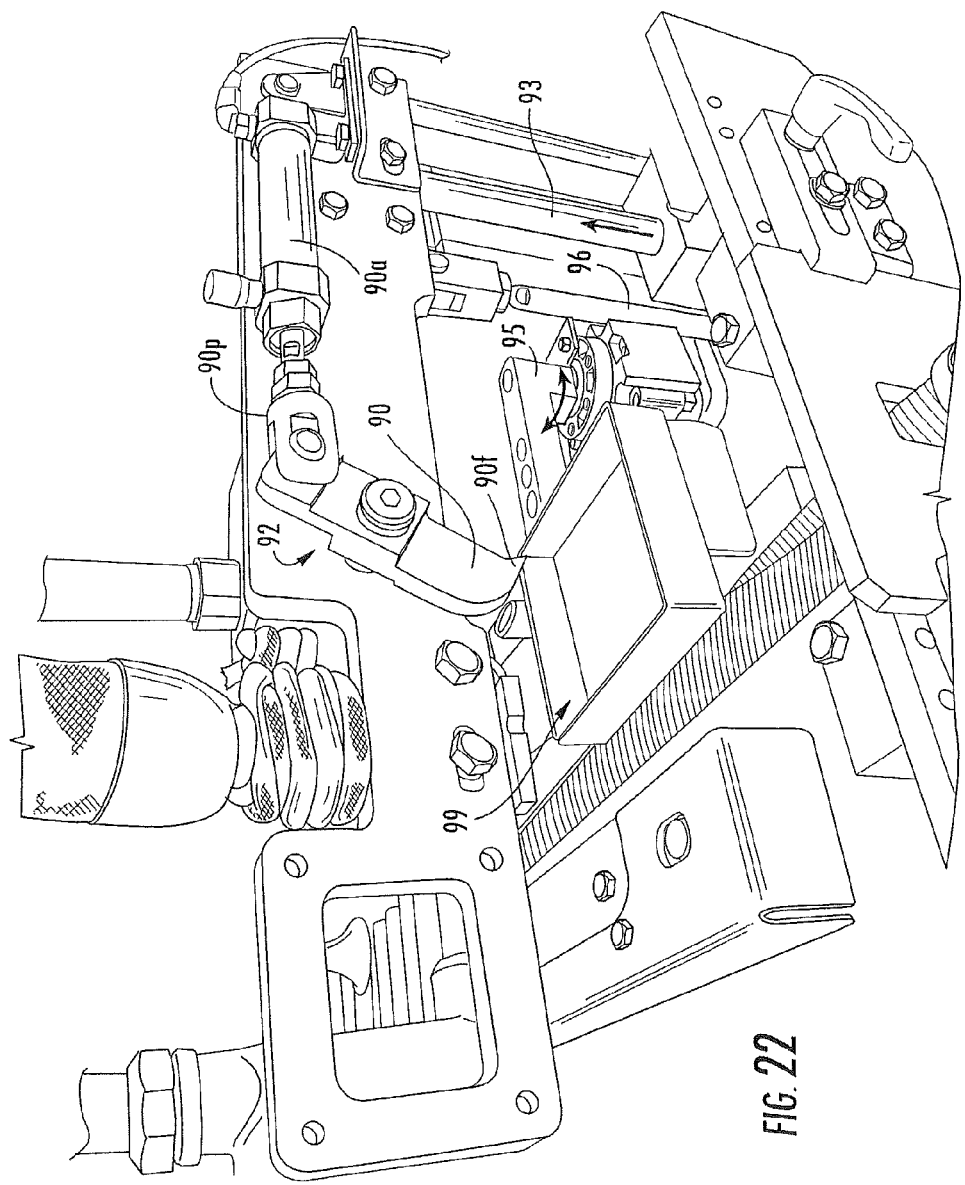

ROTATING MULTI-CLIPPER PACKAGING SYSTEMS

RELATED APPLICATIONS

This application is a continuation of U.S. patent application Ser. 13/192,637, filed Jul. 28, 2011, which issued as U.S. Pat. No. 8,272,191 on Sep. 25, 2012, which is a continuation of U.S. patent application Ser. No. 12/338,137, filed Dec. 18, 2008, which issued as U.S. Pat. No. 8,006,463 on Aug. 30, 2011, which claims the benefit of and priority to U.S. Provisional Application Ser. No. 61/015,067, filed Dec. 19, 2007, the contents of which are hereby incorporated by reference as if recited in full herein.

FIELD OF THE INVENTION

The present invention relates to apparatus, systems, methods and computer program products that stuff or otherwise fill product into casings that enclose products therein.

BACKGROUND OF THE INVENTION

Conventionally, in the production of consumer goods such as, for example, meat or other food products, the food is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming together a thin sheet of flexible material, typically elastomeric and/or polymeric material. U.S. Pat. Nos. 5,085,036 and 5,203,760 describe examples of automated substantially continuous-feed devices suitable for forming sheet material or flat roll stock into tubular film casings. Rotating multi-clipper platform systems, such as the Rota-Clip® high speed packaging systems by Tipper Tie, Apex, N.C., have been used to produce increased quantities of clipped product. See, e.g., U.S. Pat. Nos. 4,821,485; 5,020,298; 5,259,168; 5,471,815; and 5,644,896. The contents of the above referenced patents are hereby incorporated by reference as if recited in full herein.

SUMMARY OF EMBODIMENTS OF THE INVENTION

Some embodiments of the invention are directed to packaging systems. The packaging systems include a rotating platform having a vertical column and a plurality of circumferentially spaced apart clippers mounted to the rotating platform. The platform is configured to concurrently mount a plurality of clippers in respective circumferentially spaced apart clipper stations.

In some embodiments, the platform is configured to releasably interchangeably mount two different sized clippers in the different clipper stations, one of the different sized clippers being configured to output larger clip sizes than the other clipper.

In particular embodiments, the different sized clippers include on-board air supply lines that connect to air supply lines at each clip station of the platform such that, in position, the clippers are in fluid communication with a common pressurized air supply for actuation of the different sized clippers.

The table or platform can be configured to concurrently hold twelve clippers, one in each of twelve clipper stations.

The system may optionally include a split main drive sprocket residing under the rotating platform surrounding the vertical column and a drive system with a chain in communication with the sprocket that rotates the rotating platform at a desired speed. The system may also optionally include first and second vertically stacked and spaced apart plates, each of the plates being split into a plurality of adjacent pieces with a radially extending split line extending between the adjacent pieces.

In some embodiments, the system can include a location sensor in communication with the rotating platform and a frame holding the rotating platform. The system can also include a controller that receives data from the location sensor and automatically moves the rotating platform to a desired longitudinal position based on location data from the sensor and user input selecting a product type and/or size for production.

In some embodiments, the system includes a plurality of circumferentially spaced apart cradles that hold clip spools on the platform. Each cradle holds a respective clip spool with clips in cooperating alignment with a corresponding clipper. Each cradle is configured to allow a clip spool to be inserted into the cradle while a corresponding proximate clipper remains in position.

The system may include fine adjustment screws, one in communication with each of cradles, the fine adjustment screws configured to allow an operator to radially move the cradle into a desired position on the platform. Each cradle can releasably hold two spools side-by-side.

In some particular embodiments, the system can include an automated lubrication system configured to automatically mist or spray lubricant onto the sprocket and/or a chain associated therewith during operation.

In some embodiments, the system can also include a flat roll stock to a tubular covering forming system with a forming collar residing upstream of the rotating platform and an adhesive seal system in communication with the forming system that seals the flat stock in a tubular configuration. The adhesive seal system can include an automatic lifter that lifts one long edge of the covering to allow a nozzle to apply adhesive proximate the lifted long edge to seal the covering into the tubular configuration.

The nozzle can be a self-cleaning nozzle with a heater. The nozzle heater is in communication with a controller and the controller is configured to direct the heater to heat to a sufficient temperature to clean adhesive residue from the nozzle.

The adhesive seal system may include a stationary substantially horizontal extruder that merges into a curvilinear flow path that connects to the nozzle.

The adhesive seal system can include four temperature zones that can be individually controlled for temperature, including a first zone associated with the extruder, a second zone associated with an exit from the extruder, a third zone associated with the curvilinear flow path, and a fourth zone associated with an exit from the curvilinear flow path proximate the nozzle.

The lifter can be configured to automatically move between a home position that is laterally and upwardly away from a centerline of the horn and an operative position whereby the lifter travels downwardly to reside above and proximate the horn and inwardly toward the centerline of the horn.

The adhesive seal system can include a rotating drip tray that resides under the nozzle in a inactive nozzle configuration and that is synchronized to automatically rotate away from under the nozzle when the lifter moves to and/or is in its operative position.

The system can include a product horn residing upstream of the platform and a film drive system in communication with a supply of flat roll-stock film. The film drive system can include two vacuum drives, each having a belt, in communication with a display and a system controller, whereby the display is configured to accept user input to cause the vacuum drives to automatically translate the vacuum drive belts to an operative position to clamp the film against the horn.

The system can include a frame. The system can also include a product horn residing upstream of the platform, a film drive system in communication with a supply of flat roll-stock film and a forming collar residing on the horn in communication with the supply of flat-roll stock. The system can include a tool-less forming collar and horn mount assembly having first and second handles that rotate to force a member against a plate that releasably holds the horn and collar in position and a tool-less horn mounting assembly that holds the horn upstream of the forming collar. The tool-less horn mounting assembly can include first and second blocks that define a substantially cylindrical cavity therebetween. The first and second blocks can be configured to releasably attach together via a handle in communication with a rod that extends through the first and second blocks and clamps the blocks against the horn.

Other embodiments are directed to an adhesive sealing module for a packaging system. The module includes: (a) a stationary-mounted substantially horizontal extruder in communication with a hopper of bulk adhesive; (b) a curvilinear heated conduit having opposing upper and lower end portions, the upper end portion being in fluid communication with an adhesive exit portion of the substantially horizontal extruder; (c) an adhesive dispensing nozzle in fluid communication with and positioned proximate the lower end portion of the heated conduit; (d) a roll of flat sheet stock in communication with a forming collar and a substantially horizontally extending horn configured to form the sheet stock in situ into a substantially tubular shape with open overlapping long edges about the horn; and (e) an automated lifter mechanism in communication with the roll of flat sheet stock downstream of the forming collar. In operation, the lifter mechanism is configured to automatically translate to lift a top one of the overlapping long edges of the sheet stock whereby the adhesive dispensing nozzle automatically dispenses flowable adhesive between the long edges of the formed sheet stock.

The nozzle can be a self-cleaning nozzle that is in communication with a system controller that electronically directs a heater associated with the nozzle to heat to a sufficiently high temperature to melt and release adhesive residue in the nozzle.

Still other embodiments are directed to a computer program product for operating a packaging system with a rotating table having a plurality of circumferentially spaced apart clippers thereon in communication with a horn and flat stock to generally tubular film or covering forming system. The computer program product includes a computer readable storage medium having computer readable program code embodied in the medium. The computer-readable program code including: (a) computer readable program code configured to monitor and adjust temperatures in four different temperature zones associated with an adhesive flow path that terminates into an adhesive dispensing nozzle; and (b) computer readable program code configured to increase, then decrease, temperature of the heating zone proximate the dispensing nozzle to cause the dispensing member to perform a self-cleaning or self-clearing operation, thereby inhibiting clogging of the dispensing nozzle.

Still other embodiments are directed to a computer program product for operating a packaging system with a rotating table having a plurality of circumferentially spaced apart clippers thereon in communication with a horn and flat stock to a generally tubular film or covering forming system. The computer program product includes a computer readable storage medium having computer readable program code embodied in the medium. The computer-readable program code includes computer readable program code configured to programmatically provide recipe-specific position adjustment of the table, the clippers and display of set-up data for operators.

Additional embodiments are directed to clip spool cradles configured to releasably hold and release at least one, typically two, side-by-side clip spools.

Still other embodiments are directed to a packaging system with a product horn having a forming collar thereon and a roll of flat sheet stock in communication with the forming collar and the product horn, The system is configured to form the sheet stock in situ into a substantially tubular shape with open overlapping long edges about the product horn. The system also includes a hot adhesive supply source in communication with a nozzle and an automated lift mechanism configured to automatically lift a top one of the overlapping long edges to allow the adhesive nozzle to move under the lifted long edge and apply sealant between the overlapping long edges.

Still other embodiments are directed to a rotating table holding a plurality of circumferentially spaced apart clippers with each respective clipper having a pair of cooperating clip guide bars with an aperture pattern and a guide slot that mount to the rotating table and cooperate with clipper guides that hold and lock the clipper into a desired one of multiple different radial positions.

Yet other embodiments are directed to a rotating table rotary support table holding a plurality of circumferentially spaced apart clippers with each respective clipper having a radially extendable screw defining a fine radial location/position adjustment member for the clipper.

Additional embodiments are directed to a packaging system that includes an adhesive seal system with an extruder, a dispensing nozzle and an adhesive fluid flow path comprising at least four discrete automatic temperature controlled heat zones.

Some embodiments are directed to a packaging system with a rotating table with a vertical column, the table having a plurality of circumferentially spaced apart clippers in fluid communication with a pressurized air supply and air preparation units and a split sprocket surrounding the vertical column in communication with a drive system for rotating the table at a desired speed.

The table can be configured to releasably mount different sized clippers, one that applies larger clips than the other, and wherein the system air supply and air preparation units allow for rapid actuation of the different clippers at a rate of about 300 pieces per minute or 300 feet/min of film to thereby provide substantially the same operational output irrespective of the clipper used.

Some embodiments are directed to a packaging system that includes a horn with a forming collar and a tool-less forming collar assembly support shoulder attached to a frame of the packaging system. The tool-less forming collar assembly includes a support plate with a semi-circular cavity and at least one user-accessible handle attached to the support plate, the at least one handle in communication with a laterally translating member that locks the horn in a substantially horizontal orientation.

Yet other embodiments are directed to a rotating table with a plurality of circumferentially spaced apart clippers. The table is in communication with a sprocket and chain. The table further includes an automated sprocket lubricator sprayer system that is configured to automatically spray or mist lubrication onto the sprocket and/or chain at defined intervals and/or after a predetermined number of rotations of the table.

Additional embodiments are directed to packaging systems with a plurality of cooperating different drive systems. The system includes: (a) a rotating table holding a plurality of circumferentially spaced apart clippers, the rotating table in communication with a table drive system with a selectable rotation speed; (b) a film drive assembly having a film drive system in communication with a supply of flat roll stock film having a selectable speed, the film drive assembly residing upstream of the rotating table with clippers; (c) an adhesive seal system in communication with the film drive system and residing upstream of the table with the clippers, the adhesive seal system having an extruder with an extruder drive system with a selectable extrusion speed in communication with an adhesive flow path that terminates into an adhesive nozzle; and (d) an automated control system in communication with the table drive system, the film drive system and the extruder drive system, configured to synchronize operation, adjust drive speed of one or more of the drive systems during operation of the packaging system and adjust each drive system to operate at a defined speed to cooperate to produce a desired product.

The system may include a horn with an exit portion that ejects filling into lengths of sealed casing. The automated control system is configured to adjust a speed of at least one drive system responsive to force exerted against a dancer arm positioned between the rotating table and the exit portion of the horn so as to be in communication with tensioned filled sealed covering.

Yet other embodiments are directed to a packaging system with a horn that terminates at an end portion proximate a pump interface into a horn collar and pump to horn interface block that releasably holds the horn in sealed fluid communication with the pump.

The horn collar and horn may be held to the system frame by a tool-less horn mount assembly with the block having an upper and lower block member that hold the horn therebetween and attach and release with a user-accessible handle.

Additional embodiments are directed to methods of packaging lengths of products using a packaging system with a multi-clipper rotating table, that include at least one of the following steps, typically a plurality of the steps, and may be carried out using all of the following steps:

(a) accepting user input on a display to select a desired product and/or recipe for production; (b) electronically determining desired operating parameters using based on the user input; (c) electronically determining a longitudinal position of the rotating table; (d) automatically translating the rotating table to a desired longitudinal position based on the selected product or recipe; (e) accepting user input to cause film drives to close against a product horn; (f) electronically monitoring temperatures in an adhesive flow path and adjusting heating zone temperatures to remain within desired operational ranges; (g) electronically directing an adhesive nozzle in communication with the adhesive flow path to carry out a self-cleaning operation; (h) electronically directing a lubricant to mist or spray onto a chain or sprocket associated with a drive system for the rotating table; (i) automatically lifting a top long edge of overlying film layers, then electronically directing the nozzle to advance to dispense adhesive between the overlying film layers; (j) electronically accessing an operating system and/or controller of the system from a remote location using a computer network; (k) electronically synchronizing different drive systems of the system to cooperate at appropriate speeds, including the synchronization of a film drive, an adhesive extruder drive, and the rotating table drive; and (l) replacing one or more spools of clips on the table using a drop in cradle that releasably holds the clip spools.

Although described above with respect to method aspects of embodiments of the present invention, it will be understood that these features may also, be embodied as systems, subsystems, modules and/or computer program products.

These and other objects and/or aspects of the present invention are explained in detail in the specification set forth below.

BRIEF DESCRIPTION OF THE DRAWINGS

FIG. 4A is an end view of an exemplary cradle for releasably holding clip spools according to embodiments of the present invention.

FIG. 21 is a side perspective view of the lifter shown in FIG. 20 illustrating the lifter translated vertically down and pivoted toward the axial centerline of the horn to travel under the top layer of the film, synchronized with the nozzle to allow the nozzle to travel between the overlying layers in response to the lifting operation according to embodiments of the present invention.

FIG. 22 is a side perspective view of the lifter shown in FIG. 20 illustrating the lifter in an upwardly extended rest or home configuration and with an adhesive drop tray that can be rotated to reside under an adhesive output nozzle according to embodiments of the present invention.

DETAILED DESCRIPTION OF EMBODIMENTS OF THE INVENTION

Figure 1:
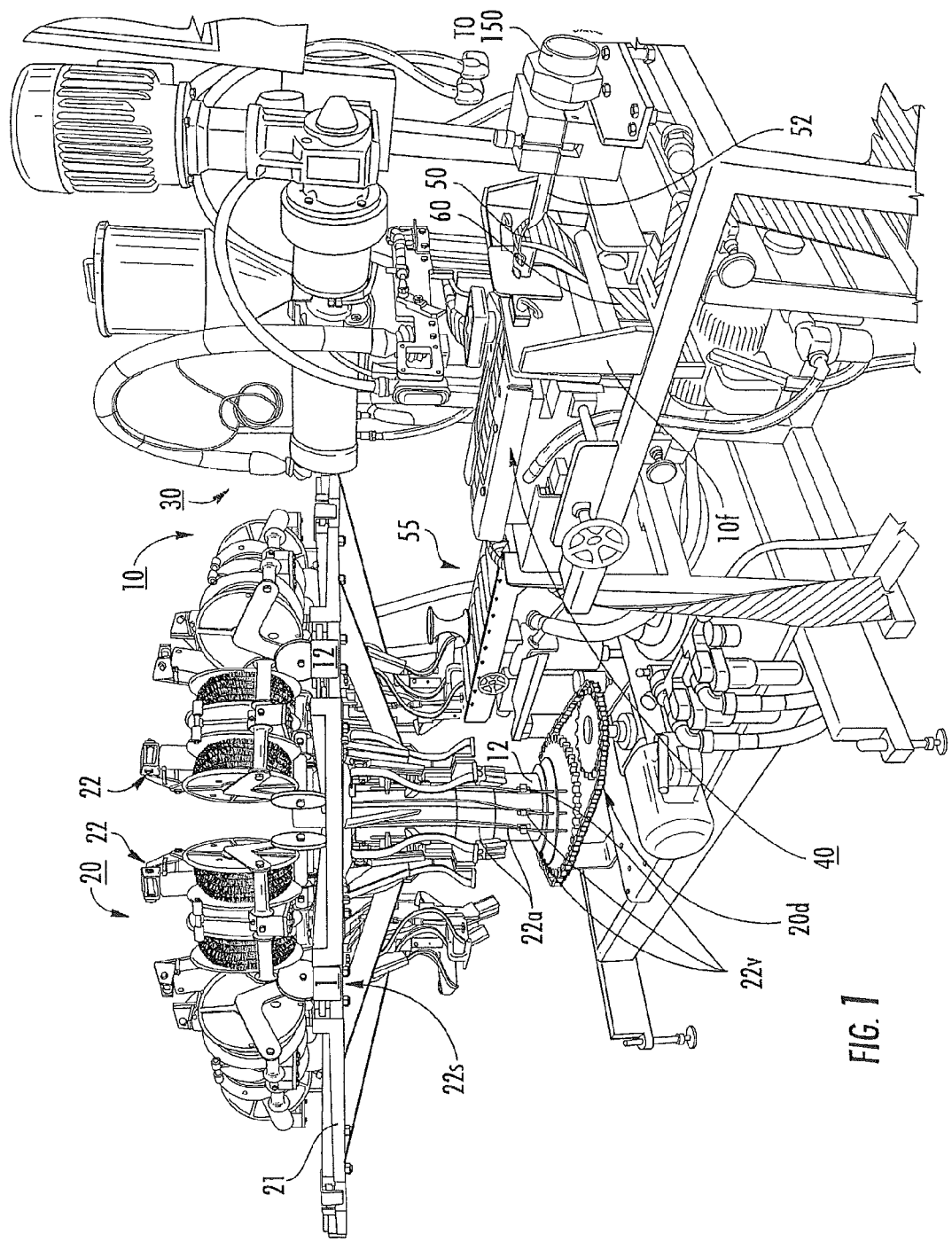
FIG. 1 is a front perspective view of a multi-clipper rotation platform packaging system according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one embodiment may be used alone or with another embodiment although not specifically described with respect to that other embodiment.

In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated, otherwise. The term "concurrently" means that the operations are carried out substantially simultaneously.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The frame can be a floor mount frame. The term "automated" means that operations can be carried out substantially without manual assistance, typically using programmatically directed control systems and electrical and/or mechanical devices. The term semi-automatic means that operator input or assistance may be used but that most operations are carried out automatically using electromechanical devices and programmatically directed control systems.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The terms "adhesive" or "glue" means a material that when applied to a seam or overlying edge portions of a covering or casing material can adhere the edges to seal the product (typically in a substantially tubular or elongate shape). The seal is typically strong and is able to withstand desired pressures. For food products, the adhesive can be biocompatible. Examples of suitable adhesives include, but are not limited to, polymers such as melted HDPE (high density polyethylene).

Embodiments of the present invention are particularly suitable for producing encased products that cooperate with clippers to apply clips to seal products held in the casings. The product may be a linked chain of elongated extruded product held in a casing. The casing or covering can be any suitable material or materials (edible or inedible, natural or synthetic) such as, but not limited to, collagen, cellulose, elastomeric, polymeric and/or plastic casing. The term "film" refers to a thin flexible sheet of covering material. When used with food products, the film, casing or covering should be food-compatible.

Referring now to the figures, the system 10 (FIG. 1) includes a rotating platform 20 with a table top 21 with circumferentially spaced apart clippers 22 (typically double clippers). The system may also include a flowable adhesive fluid delivery path 30, a horn 52 and a forming collar 50. As is well known to those of skill in the art, the forming collar 50 is configured to form sealed (seamed) substantially tubular casings from an elastomeric and/or polymeric sheet and/or planar roll stock that is then stuffed or filled with flowable product. More typically, the roll stock is an elastomeric and/or polymeric sheet that is relatively thin. The roll stock can be flat sheet stock of a flexible film that can be formed in situ into a continuous length of heat-sealed and/or otherwise joined or seamed tubular casing. The forming can be carried out substantially automatically and continuously over a desired interval (typically between at least about 45-60 minutes, depending on the size of the length of the roll stock). The seaming can be performed using a hot-melt flowable material, such as a polymer, as the adhesive that seals two layers together. The seaming can use additional and/or other suitable sealing means, including, for example, ultrasonic, light (ultraviolet or other desired wavelength), chemical, and/or other sealing means. The seam can be a flat seam, a fin seam, or other overlapping and/or abutting joint configuration, but is typically formed with one long edge 62 of the casing 60 overlapping the other as shown, for example, in FIG. 21.

The encased elongated or tubular product can be an elongated food product, such as a meat product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include powders such as granular materials including grain, sugar, sand, explosives and the like or other flowable materials including wet pet food (similar to that held conventionally in cans) or other powder, granular, solid, semi-solid or gelatinous materials. The product may be a packaged in any suitable industry including food, aquaculture, agriculture, environment, chemical, explosives, or other applications.

Figure 2:
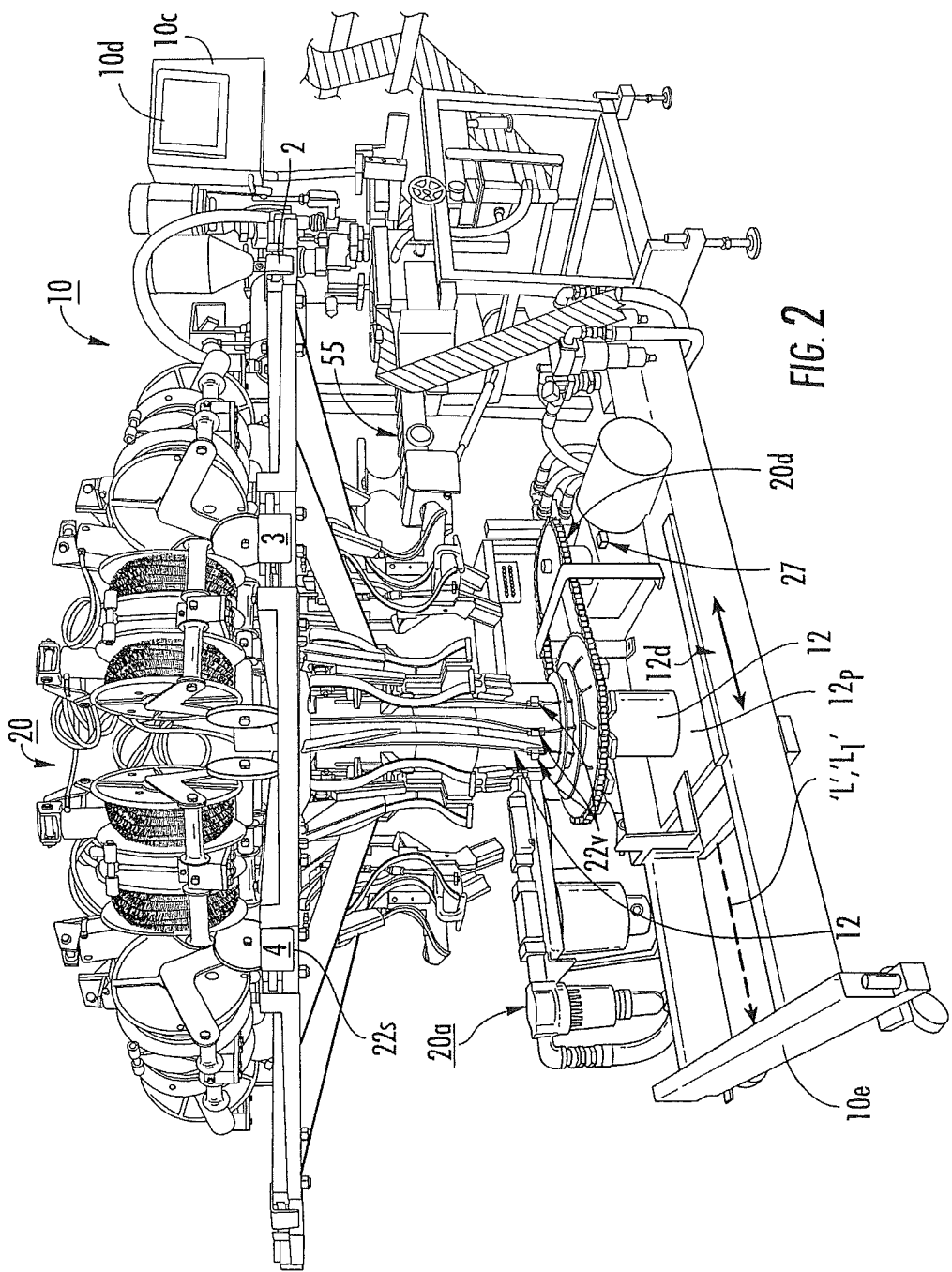
FIG. 2 is an end perspective view of the system shown in FIG. 1.

Turning to FIGS. 1 and 2, an exemplary rotating platform multi-clipper system 10 is shown. Although shown as including (typically dual) clippers 22, not all need be operational during a packaging operation (e.g., alternating ones can be deactivated), or the table 20 may include other numbers of clippers 22, typically between 10-14. Conventional Rota-Clip® systems are available from Tipper Tie, Apex, N.C. The number of clippers 22 used in combination with the circumference of the table 20, and/or the radially adjusted position of the clippers 22 on the table 20 can allow for different lengths of end product to be produced. For example, for the same clipper radial positions, one operation using all 12 clippers 22 can produce a six-inch product and if every other clipper 22 is deactivated, up to a 36 inch product can be used. Larger sizes can be achieved using alternate configurations. As shown in FIGS. 1 and 2, the system 10 can include miniature ball valves 22v, typically one for each clipper 22 in communication with a pneumatic control that automatically controls the activation and deactivation of the respective clipper 22 based on the system (HMI/PLC) controller 10c. As with conventional rotating platform clippers, in operation, the sealed filled tubular covering is clipped under the platform table surface.

Figure 10:
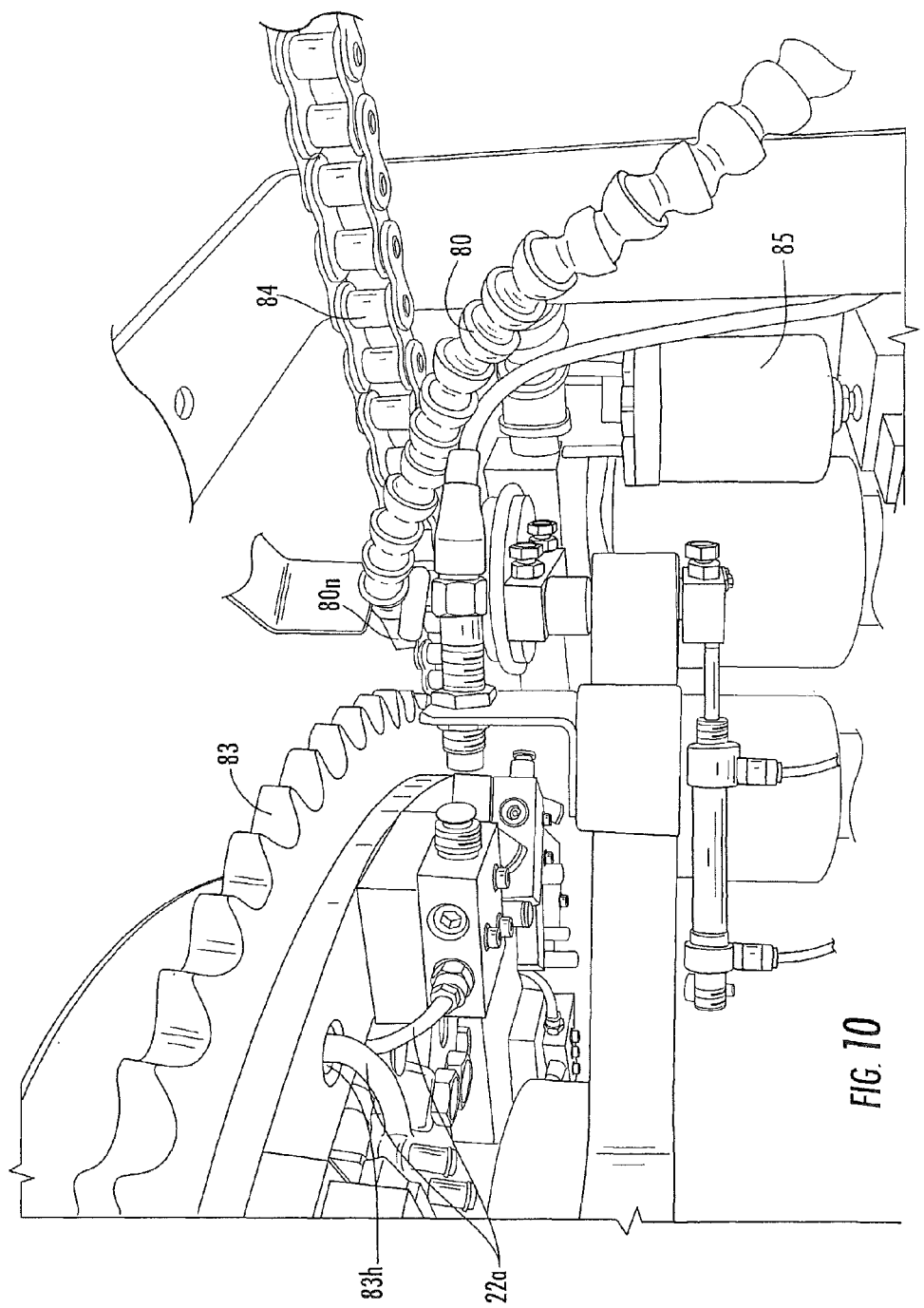
FIG. 10 is a partial bottom view of the platform shown in FIG. 1 illustrating an automatic oil sprayer for the platform-rotation drive sprocket and/or chain according to embodiments of the present invention.

As shown in FIGS. 1 and 2, there are two air lines 22a that run down the center column 12 for each clipper station 22s. One line is the main air line for the trigger valve underneath the sprocket 83 (FIG. 10). The second air line allows the clipper gate of the respective clipper 22 to close. It also has an inline shut off valve 22v installed in the tubing. If this is used, it shuts off the air to the gate cylinder on that individual clipper. If the gate does not close the clipper will not "fire" (send down the punch or fire the knife). The reason behind turning off a clipper is to run a longer product than the normal length of product (e.g., chub) each clipper can handle. For example, if clipper #1 is on, clipper #2 is off, and clipper #3 is on, the product length becomes the distance from the #1 clipper to the #3 clipper.

This activation/deactivation status can be based on the "recipe" selected by a user during set-up. The term "recipe" means that the system 10 can be preloaded, programmed and/or configured with a plurality of different operating conditions and/or configurations based on the desired output. The system 10 can accept user input to select the desired product and the system can automatically electronically implement different parameters such as different drive speeds, table position, extruder speed, desired clipper activation pattern such as, for example, clipper nos. 1, 3, 5 . . . 11, clipper nos. 2, 4, 6, 8, 10, 12, or clipper nos. 1-12, and the like used based on a pre-defined "recipe" that can generate the desired output.

The user input can be a list or blocks on a display with visual indicia of product types, names and/or desired product length. The system can define the related operational parameters to achieve this output based on the recipe. The recipe may be size- and/or product-specific. For example, a user can select the desired pre-defined product and/or a product size, and the system can be configured to select or identify proper longitudinal position of the platform 20 with respect to the output feed support surface 55 (shown as comprising rollers) and/or select the drive speed of certain components, the temperature of the heat zones (e.g., A-D), correct radial pin hole position to use for mounting the clippers 22 to the platform 20, and the like, based on a defined "recipe". Thus, for example, the recipe can be programmed and configured to include an electronic library and/or look-up table of clipper position (e.g., which pin aperture number to use on the clip mounting slide bar and clip guides), which can be visually displayed for an operator and can also automatically activate the desired clippers 22 and select the platform 20 rotation speed, the covering draw speed (e.g., film or casing), temperatures for one or more of the zones A-D, and the adhesive extruder speed.

The rotating platform or table 20 can be in communication with an improved air supply and air preparation system 20a (FIG. 2) for actuation of the clippers so that the systems 10 can operate with interchangeable size clippers 22 and associated clips to provide improved speed, manufacturing adaptation, and/or provide the same operational output (e.g., 300 pieces per minute) irrespective of the size of the clipper 22 used.

In some embodiments, the table 20 can accept different sized clippers 22, such as a "100" series clipper available from Tipper Tie, Inc., Apex, N.C. and a "200" series clipper available from Tipper Tie, Inc., Apex, N.C. The 100 series can have a 100T clip size and the 200 series clipper can operate with a Z200 clip size. The 100 series clip sizes (smaller clipper) is normally used for products having about a 0.75 inch diameter to about a 1½ inch diameter. The 200 series (larger clipper) is normally used for product sizes up to about 3½ inch in diameter. The clip size for a particular product can be selected based upon film material thickness. In the past, two different machines were required, one for each clipper size. The larger old model clipper (200 series) required more air to run it at its maximum speed. The machine could run 300 feet of film per minute, but because of the air consumption of the large valves on the 200 series clippers, it slowed down the maximum number of pieces to 140 pieces per minute. Embodiments of the present invention employ a larger air supply system and allow for interchangeable use of the different size clippers in a manner that does not require that the machine maximum output be slowed to accommodate the larger clipper. Embodiments of the system 10 can run either set of clippers on the one machine at a speed of about 300 feet of film per minute.

The system 10 can have an air system that can run the larger clippers (200 series) at the same rate as the old systems could run the smaller clippers (100 series). That is, the system 10 can operate at a rate that is either about 300 pieces/minute or a maximum of about 300 feet of film/minute, "whichever comes first". To further explain the term "whichever comes first": the speed of the overall machine can be determined in feet of film/minute produced. The smaller length and smaller diameter products can sometimes pump faster than large ones. For example, an 8 inch long×1 inch diameter piece or "chub" of product can be pumped and produced faster than a 18 inch long chub×3 inch in diameter. Embodiments of the present invention can produce 300 pieces/minute as long as they are 12 inch and under. Pump speeds can vary for each client's facility. The system can produce about 300 feet of film/minute irrespective of the clipper size in use.

The rotating platform 20 has a vertical support 12 (also described as a column or leg) which is in communication with the main drive system 20d that rotates the platform and clippers at the desired speed (and can automatically vary the speed depending on production requirements/inputs). The air supply lines that connect to the various clippers can travel down the column 12 to an air supply. The system 10 can include a single common main air supply that can be diverted to feed all of the clippers. Alternatively, each or groups of the clippers may have a dedicated discrete air supply. Each clipper 22 can include on-board air supply conduits/lines with valves that releasably connect to the air supply lines on the column 12. The large clippers may have larger valves relative to the smaller clippers but can mount to the platform 20 using the same mounting hardware and/or mounting configuration as the smaller clippers, including allowing for the same fine and gross position adjustment as will be discussed further below. The air supply can be provided at any desired operating pressure sufficient to run the clippers at a desired speed, typically at a pressure between about 80-125 psi. The large and small clippers can interchangeably attach to the air supply lines at each clipper station on the platform 20 and the clip air supply lines on the platform can have standardized fittings that interconnect to each type of clipper.

FIG. 2 illustrates that the system 10 can also include a position or location sensor 27 that may optionally longitudinally translate 12d with the vertical table support 12 on a sliding platform 12p. The sensor 27 is configured to detect and provide data regarding the position of the forward edge of the frame 10e relative to the position of the table 20 and/or table support 12 and communicate the position data to the system controller 10c, which directs the longitudinal (motorized) drive to cause the vertical table support 12 to be longitudinally translated to automatically adjust for spacing relative to the discharge feed support 55 and/or exit end of the horn 50. The location sensor 27 can be an optical sensor(s) that can be configured to optically project substantially horizontally from a location upstream of the frame edge 10e as illustrated by the arrows in FIG. 2. The location of the platform 20 relative to the horn 50 can be automatically carried out based on a selected "recipe" that is selected for manufacture to help automatically set-up the system for operation. Previous systems employed a hand-crank wheel for movement, which required operator labor and unreliable precision in placement.

Figure 3:
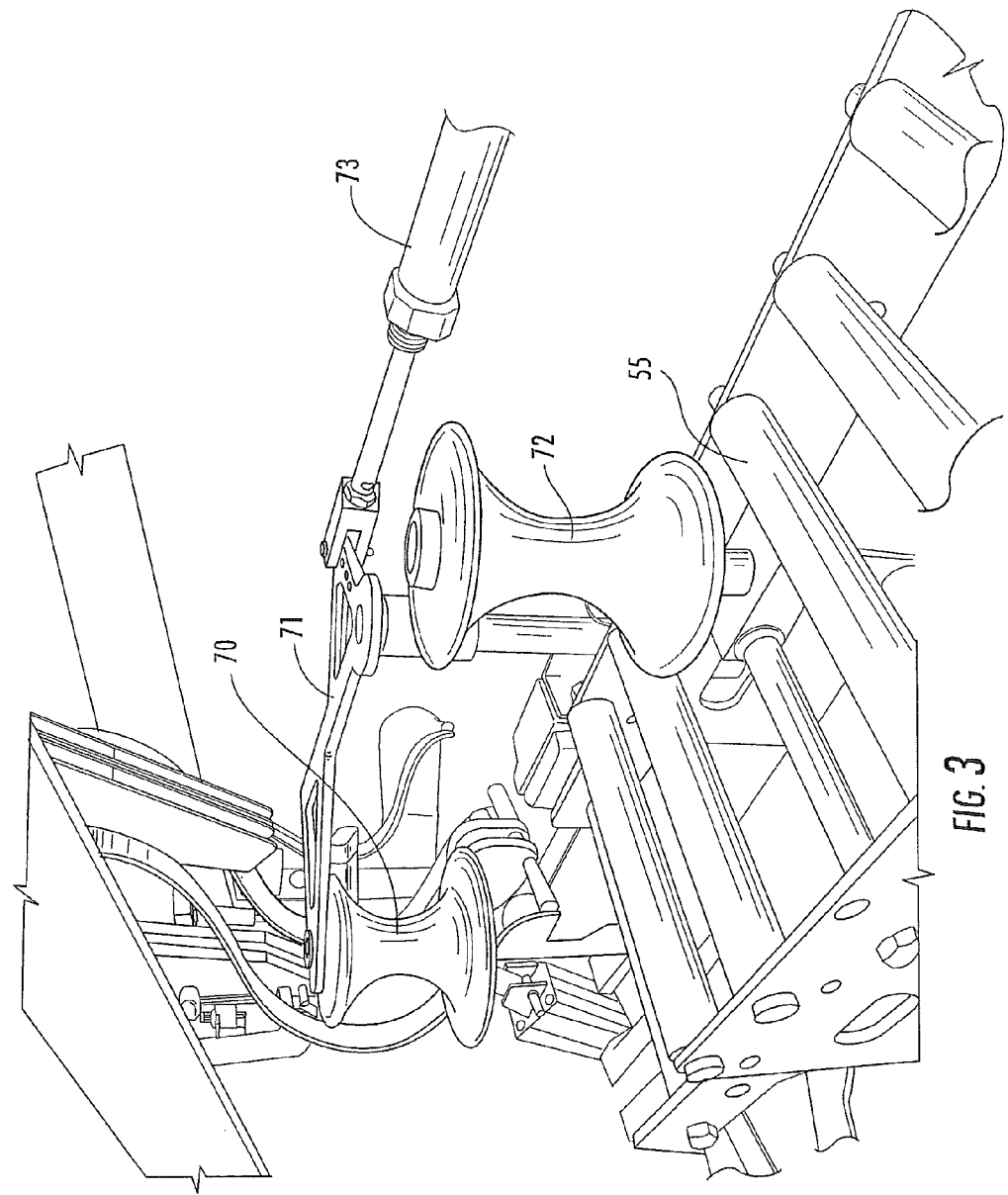
FIG. 3 is a side perspective view of a dancer arm system configured to cooperate with the tensioned product to automatically adjust the speed of the adhesive/glue applicator output according to embodiments of the present invention.

FIG. 3 illustrates that the discharge feed support surface 55 includes tension feedback members 70, 71, 72 that communicate with the filled tensioned casing/product (not shown). Member 70 is configured to translate outwardly from a pivoting arm 71 in response to excess tension, which exerts force against the member 70, causing the film speed, the adhesive extrusion speed, and/or adhesion delivery to increase. In operation, the downstream member 71 is configured to communicate with a position sensor 73 to provide the feedback to the controller to allow the controller to adjust the operational parameters.

Figure 4B:
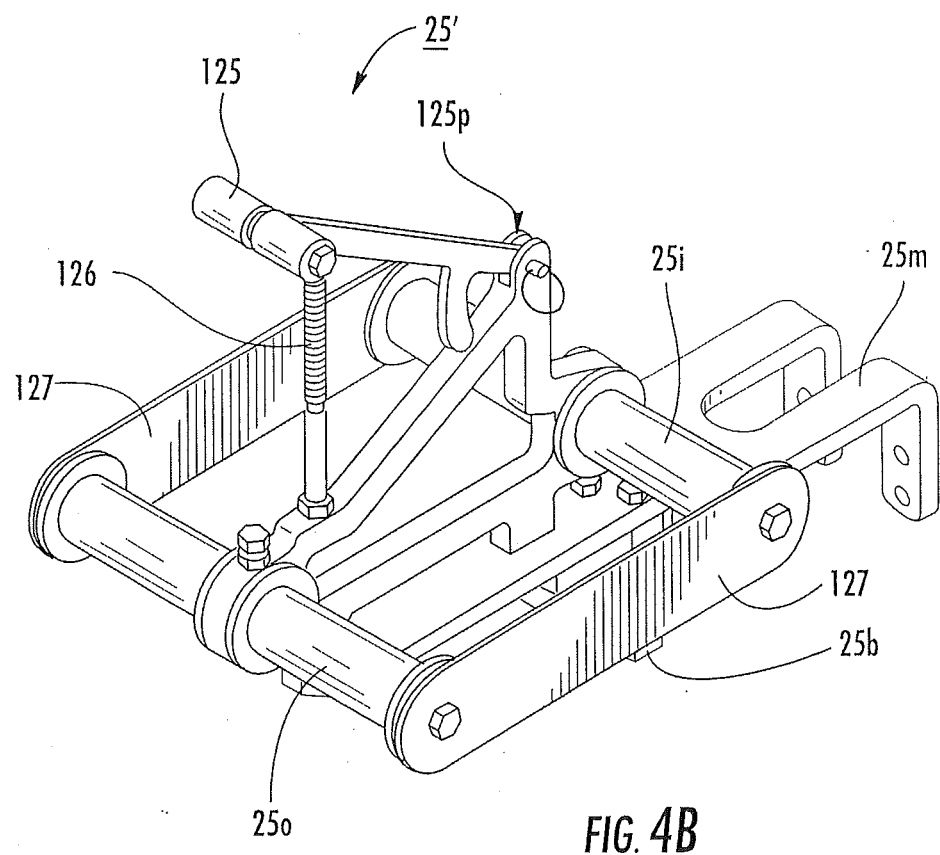
FIG. 4B is a side perspective view of another exemplary cradle according to other embodiments of the present invention.
Figure 4C:
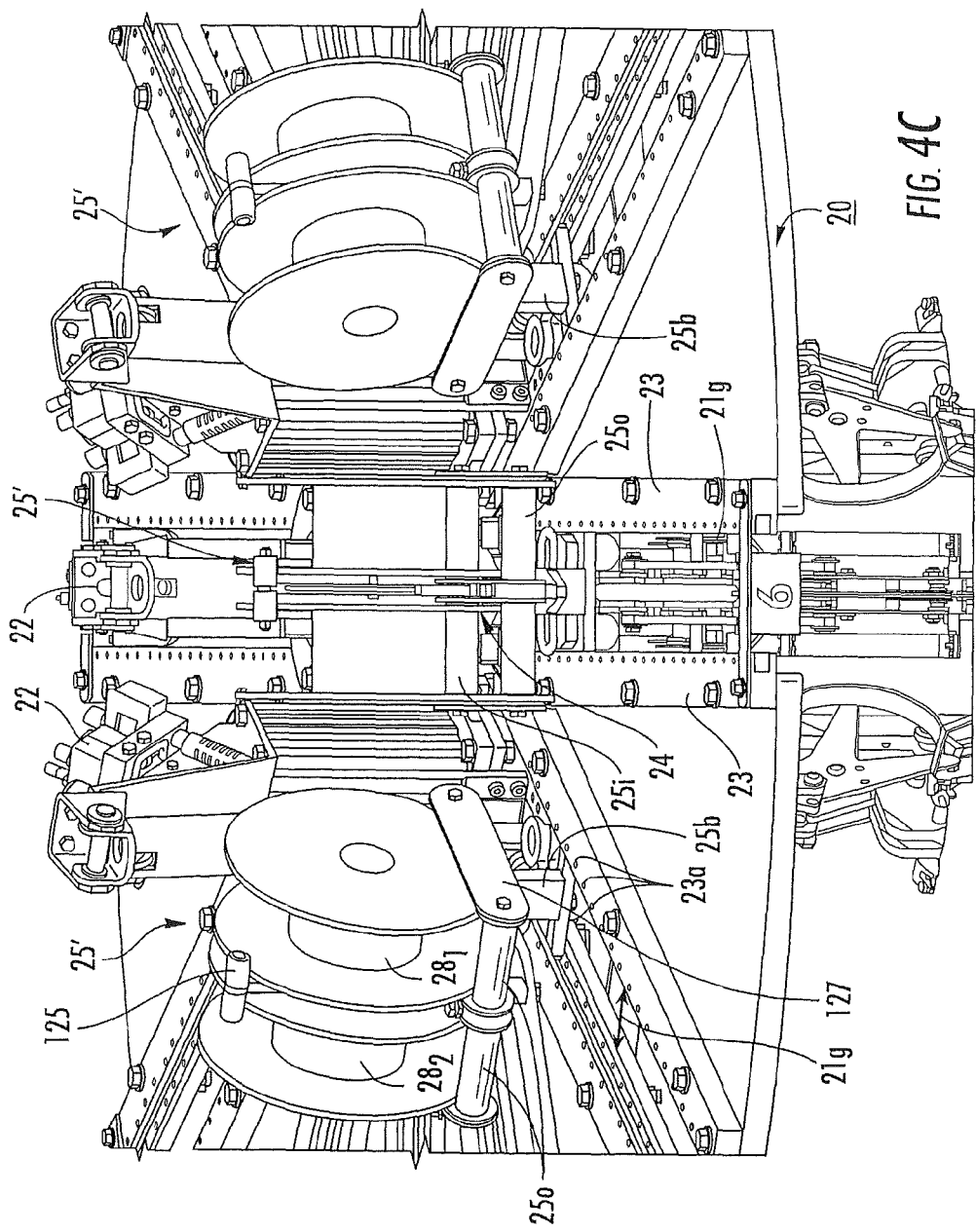
FIG. 4C is an end view a rotating table holding the cradles of FIG. 4B according to embodiments of the present invention.
Figure 5:
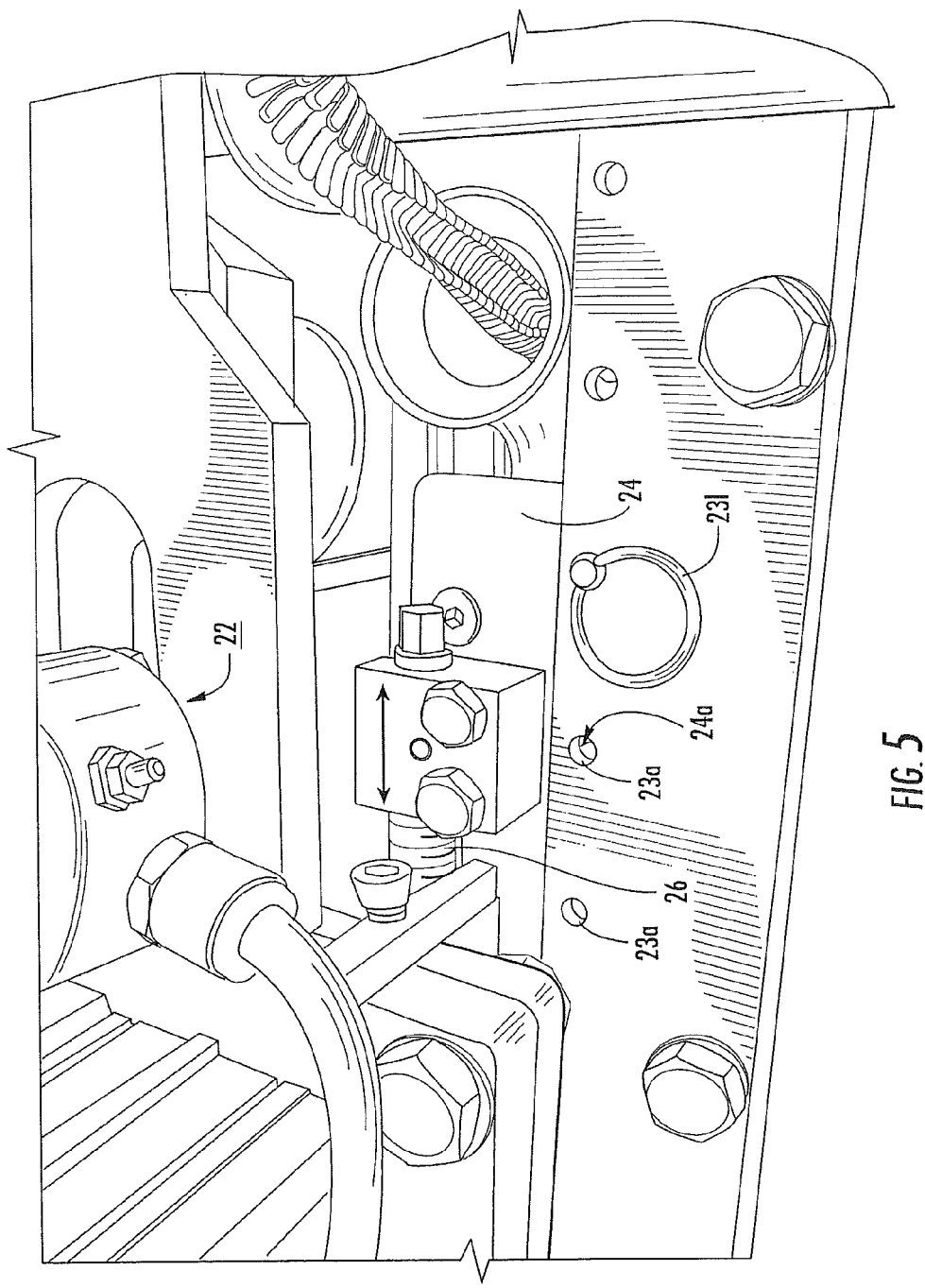
FIG. 5 is a partial top perspective view of a portion of the platform shown in FIG. 1 illustrating the clip guides with multi-position settings and fine radial adjustment capability according to embodiments of the present invention.

FIG. 4A illustrates a clip guide 23 defined by a pair of spaced apart plates $23p_1$, $23p_2$, each having a slot 23s formed therein and mounted to the table 20 across a radially extending gap 21g therebetween. Each of the clip guide plates 23p includes aligned radially spaced apart apertures 23a that releasably receive a locking pin 23l (FIG. 5) to hold the clipper 22 in a desired radial position on the table 20. FIG. 4A also illustrates a cradle 25 that releasably holds spools of clips 28 on the table 20. FIGS. 4B and 4C show an alternate embodiment of the cradle 25' as will be discussed further below. As shown in FIG. 5, the clippers 22 each include a clip mount 24 that extends across the gap 21g and slides in the slots 23s. The clip mount 24 also includes apertures 24a that receive the locking pin 23l. An operator can select different apertures 24a, 23a to define the desired radial position and lock the clipper 22 into place. The clipper mount 24 can have fewer apertures 24a than the clip guides 23, such as between about 2-3 apertures 24a, while the clip guides 23 can have between 5-10, typically about 6, apertures 23a.

Figure 6:
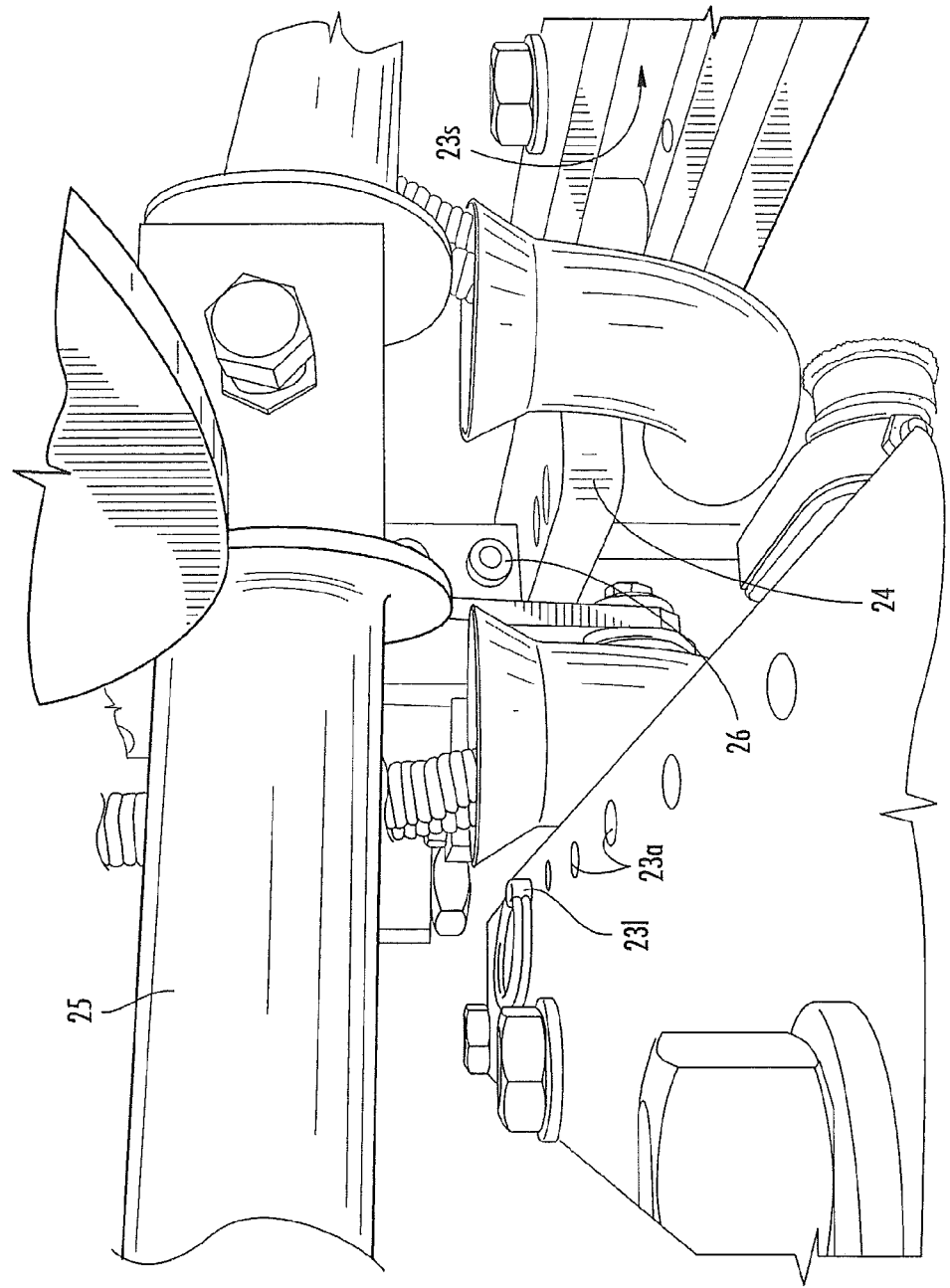
FIG. 6 is an enlarged side view of a portion of the platform shown in FIG. 1 (shown looking inward) illustrating the clip guide mounting plate with the fine radial adjustment capability as shown in FIG. 5.

In some embodiments, as also shown in FIGS. 5 and 6, the system 10 can include a "fine" radial adjustment screw 26. The "fine" radial adjustment screw can allow an operator to adjust the position after a clipper 22 is locked into a "gross" position using the selected apertures 23a, 24a. The "fine" adjustment screw 26 can move the clipper 22 for even more precise radial position. The fine adjustment screw 26 can provide for between 0.1 inch to about 1 inch or radial adjustment, but is typically less than the gross adjustment that is obtained using only the gross adjustment mounting positions. The gross adjustment can be provided using a selected pair of cooperating apertures 23a, 24a (typically allowing for about ⅛ inch radial position changes), while the fine adjustment may be used to "tweak" such a position, typically radially moving the locked-position clipper 22 less than the gross adjustments, typically by less than ⅛ inch. This fine adjustment can help set substantially exact distances between clippers 22 and can produce more accurate or reliable product lengths. The system controller 10c can reside in the HMI unit with a display 10d for touchscreen input. Other user-interface and/or inputs can be used.

Figure 7:
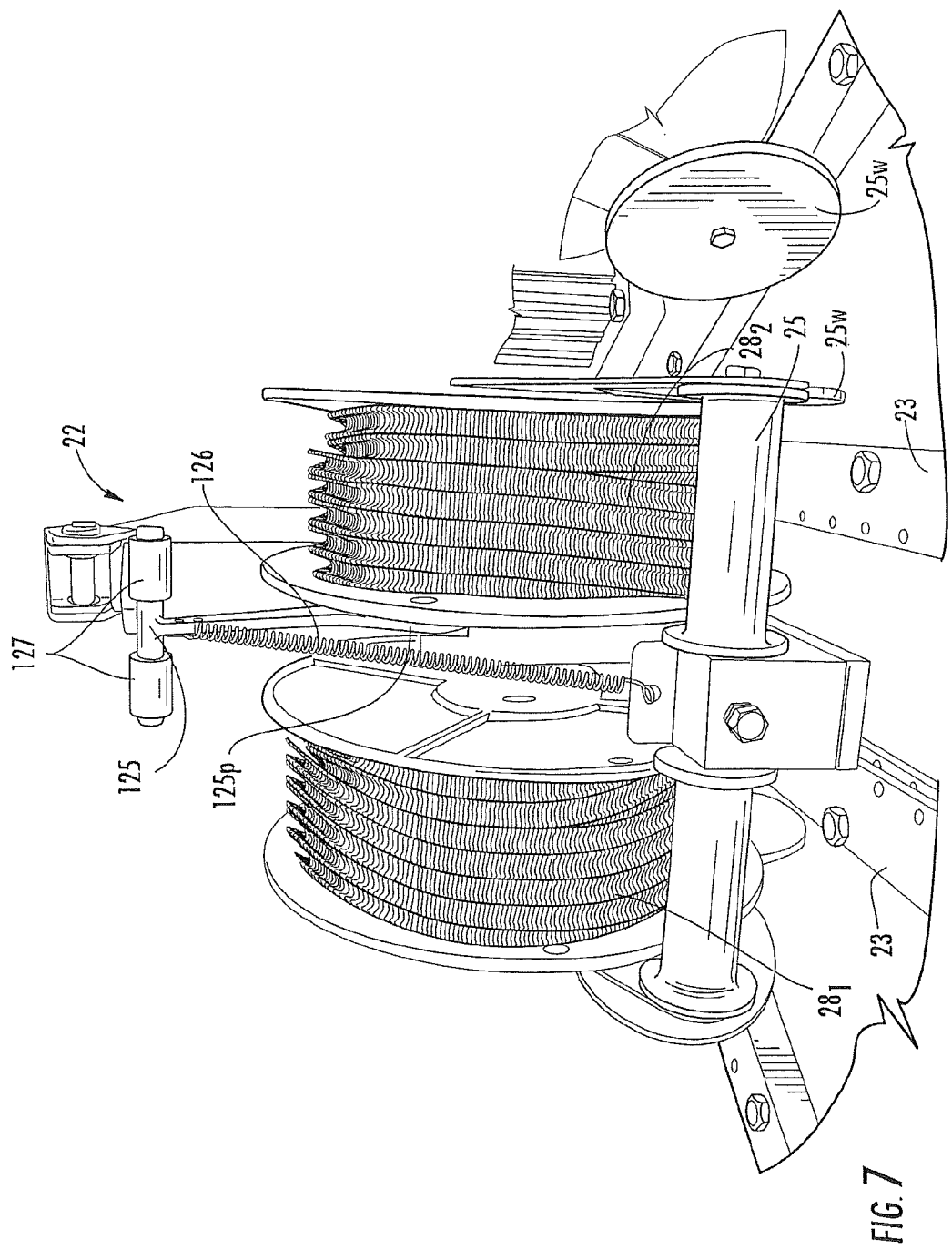
FIG. 7 is an end view of the cradle shown in FIG. 4A illustrating the spool lock lifted to allow easy access to the loaded spools according to embodiments of the present invention.
Figure 8:
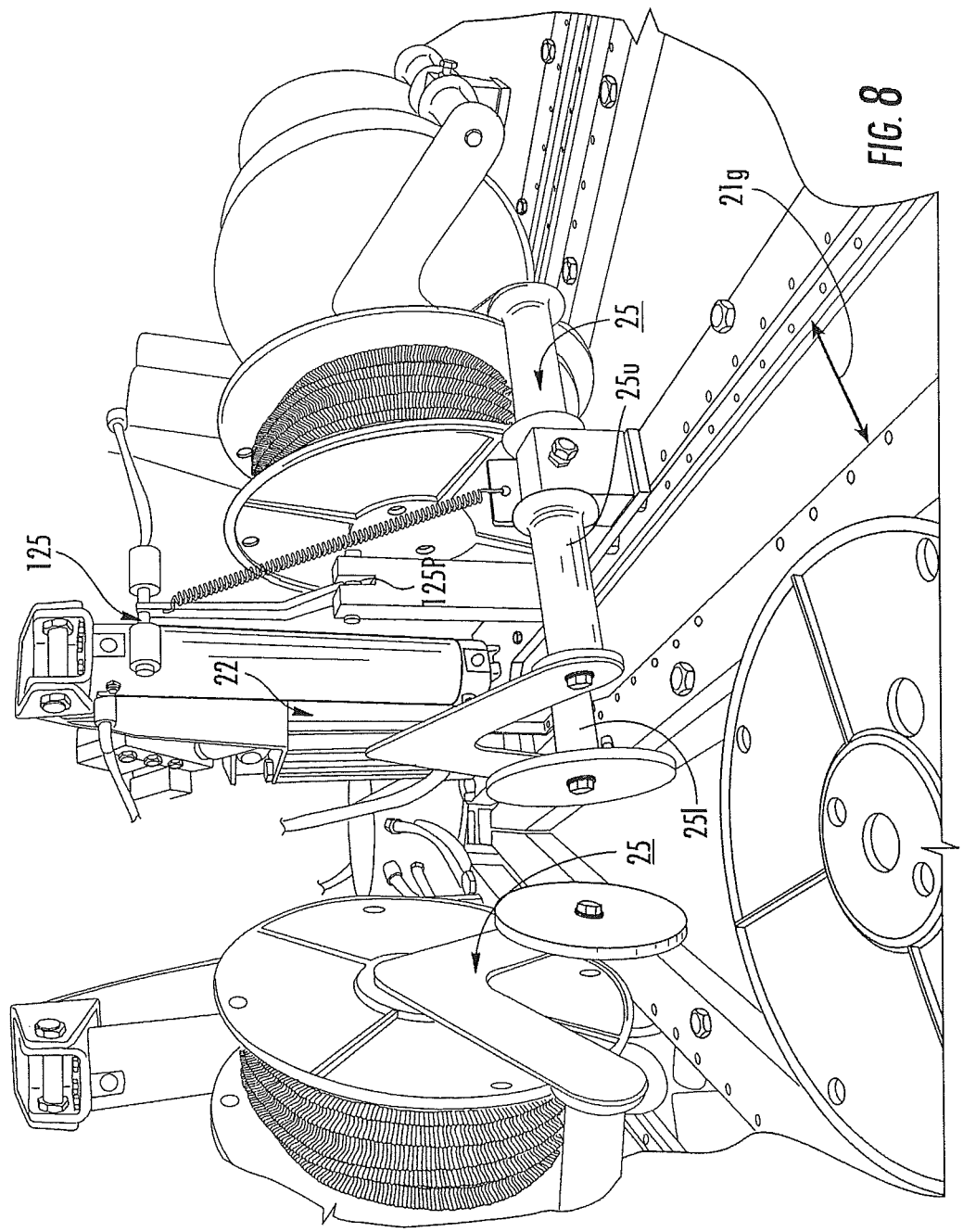
FIG. 8 is a side perspective view of the cradle shown in FIG. 4A illustrating one spool removed from the cradle while the handle is lifted according to embodiments of the present invention.
Figure 9:
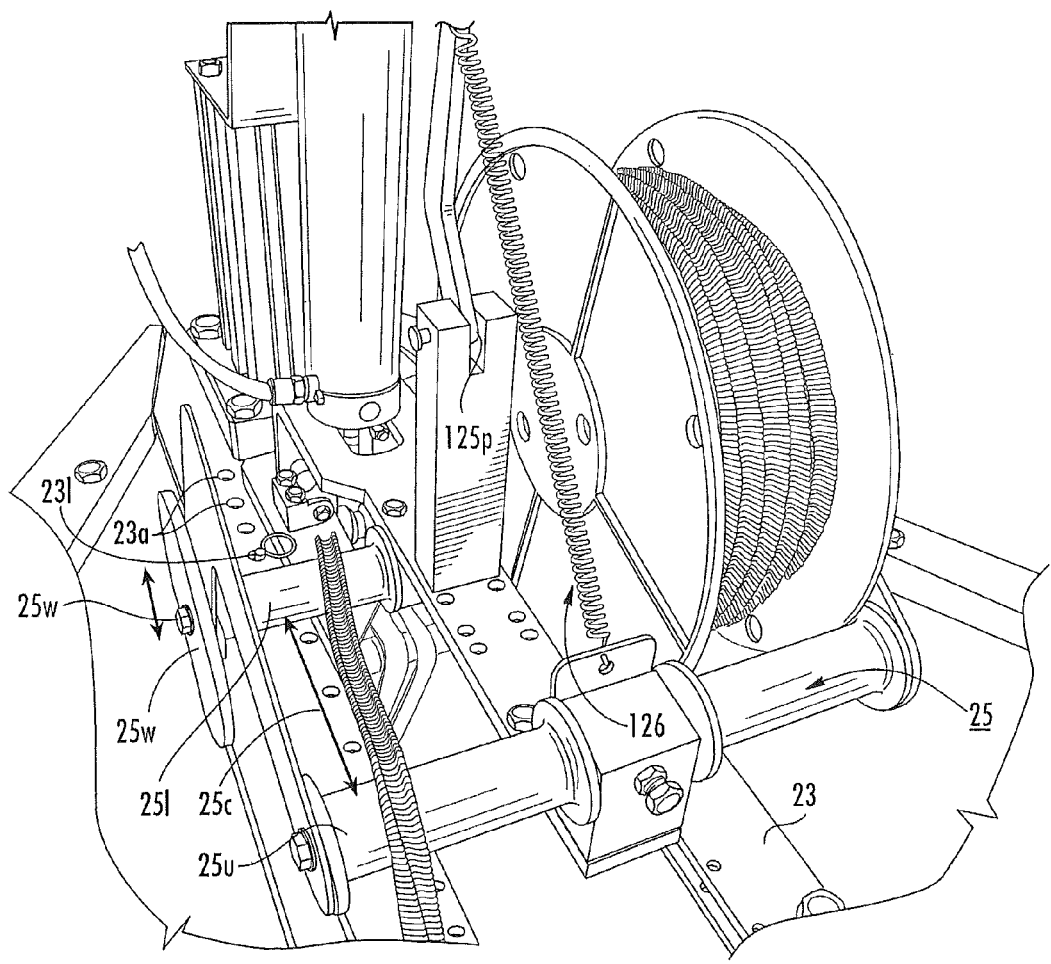
FIG. 9 is an enlarged view of the cradle shown in FIG. 8.

FIGS. 7-9 illustrate easy-release and mount spool cradles 25 according to embodiments of the present invention. This configuration allows for rapid clip reload as the clipper can remain in position while the clip spool with the clips can be dropped into the cradle 25. The cradle 25 is configured to snugly hold two side-by-side clip spools $28_1$, $28_2$. As shown in FIG. 8, the cradle 25 is aligned with and can be mounted to the clipper 22 and also reside on the surface of the table 21. One side of the cradle may span the gap 21g. The cradle 25 can include an upwardly extendable spring 126 configured to bias the handle 125 to a retracted configuration that can be lifted upward to allow a clip spool to be easily withdrawn and a different spool dropped straight in as desired. The spring 126 can be provided as a coil spring or another resiliently configured device that can provide the desired retention force and/or bias. The cradle 25 can be configured to define two spool holding cavities 25c that snugly receive the respective spool $28_1$, $28_2$, and that extend radially between an upper and lower (rigid elastomeric) tubular bar, 25u 25l as shown in FIG. 8. The cradle 25 can include a handle 125 that can pivot between open and closed positions via pivot 125*p*. The handle 125 can comprise two lateral top portion extensions (e.g., a "T" shape) to snugly reside against adjacent spool walls of the different clip spools (FIG. 2) to inhibit the spools from "free wheeling". The cradle 25 can be configured to hold different size clips (such as the "100" and "200" size clips and associated clippers are available from Tipper Tie, Inc., Apex, N.C.), The spool width for each different clip size can be substantially the same. The cradle 25 can be configured to radially slide as the clipper mount 24 slides into the desired clipper mounting location on the platform or table 20. As shown the cradle 25 can include inner wheels 25*w* on the outside of the lower bars 25*l* that reside on the support surface of the table 20.

FIGS. 4B and 4C illustrate another embodiment of the cradle 25'. In this embodiment, instead of the wheel 25*w* discussed above, the cradle 25' mounts to the table 20 using a block 25*b* and an inner mount 25*m* that hold the front and back members 25*i*, 25*o* above the table 20 and in alignment with adjacent corresponding clippers 22. The cradle 25' can translate with the adjustment of the clipper 22 as discussed herein. The block 25*b* can engage the slots 23*s* and the front mount 25*m* can engage a clipper 22. As for the embodiment shown in FIG. 4A, the cradle 25' has inner and outer members 25*i*, 25*o* that can be radially spaced apart and cooperate to hold a respective clip spool 28. The members 25*i*, 25*o* can be rollers that can mount on an internal rod that extends between and attaches to outer mounts 127. The members 25*i*, 25*o* can reside at substantially the same level (rather than one residing above the other).

Figure 11:
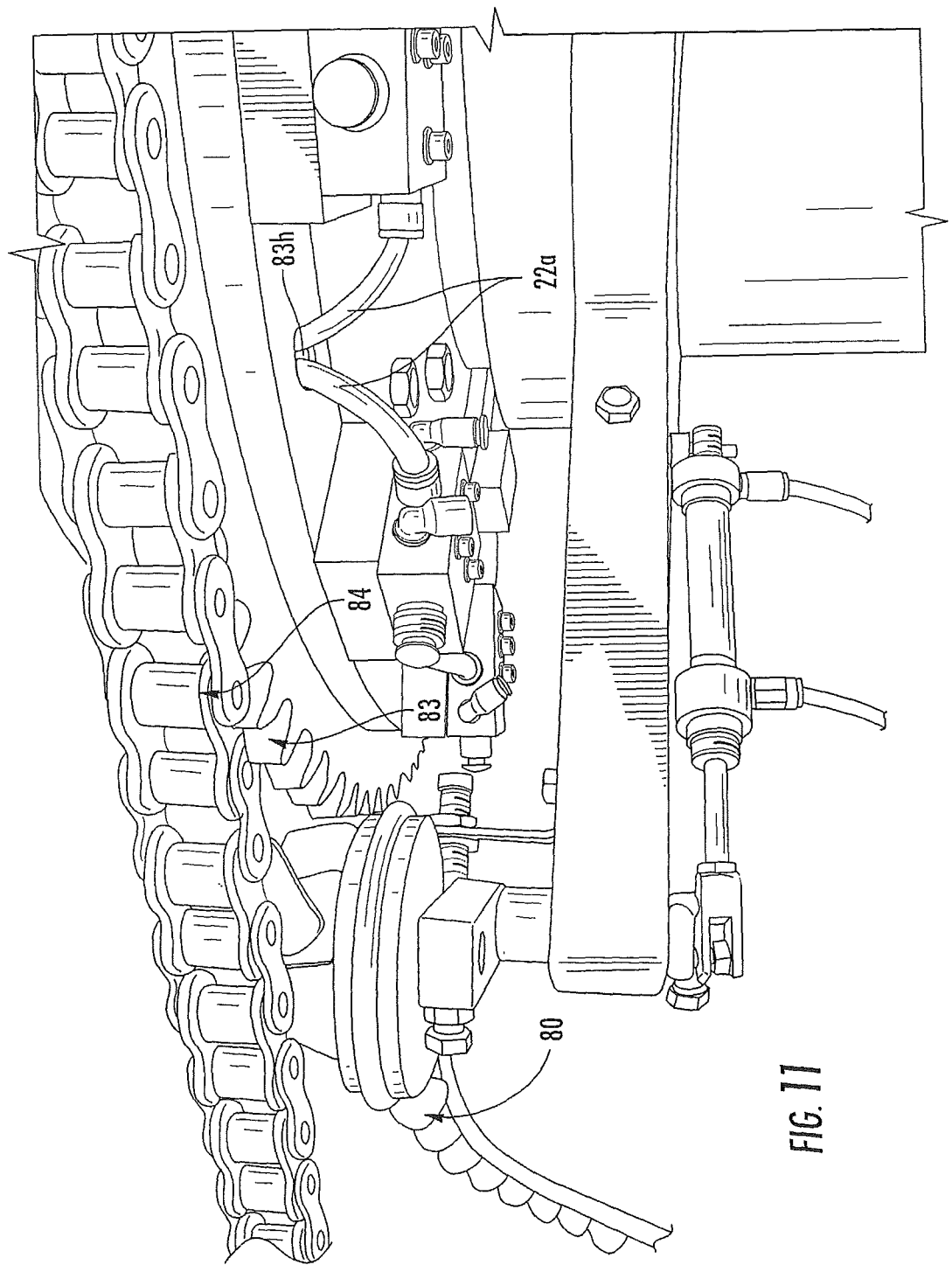
FIG. 11 is a partial bottom view taken from the opposing side of that in FIG. 10 illustrating, inter alia, the automatic oil sprayer shown in FIG. 10.

FIGS. 10 and 11 illustrate a sprocket 83 and chain drive 84 in fluid communication with an automated lubrication spray system 80 that extends from an oil supply 85 to a nozzle 80*n* that is directed to spray the teeth of the sprocket 83 and/or the chain 84 as the chain contacts the sprocket 83. The system 10 can be configured to automatically activate the sprayer nozzle 80*n* periodically (e.g., every 10 minutes or every certain number of revolutions of the table 20) and to have the sprayer 80*n* spray or mist the entire perimeter of the sprocket 83 at least once per activation. The activation is typically programmatically directed based on communication from the system controller. The lubricant spray can be in a fine mist to inhibit pooling of fluid under the system 10. A catch tray may be placed between the sprocket and the floor (not shown).

Figure 12:
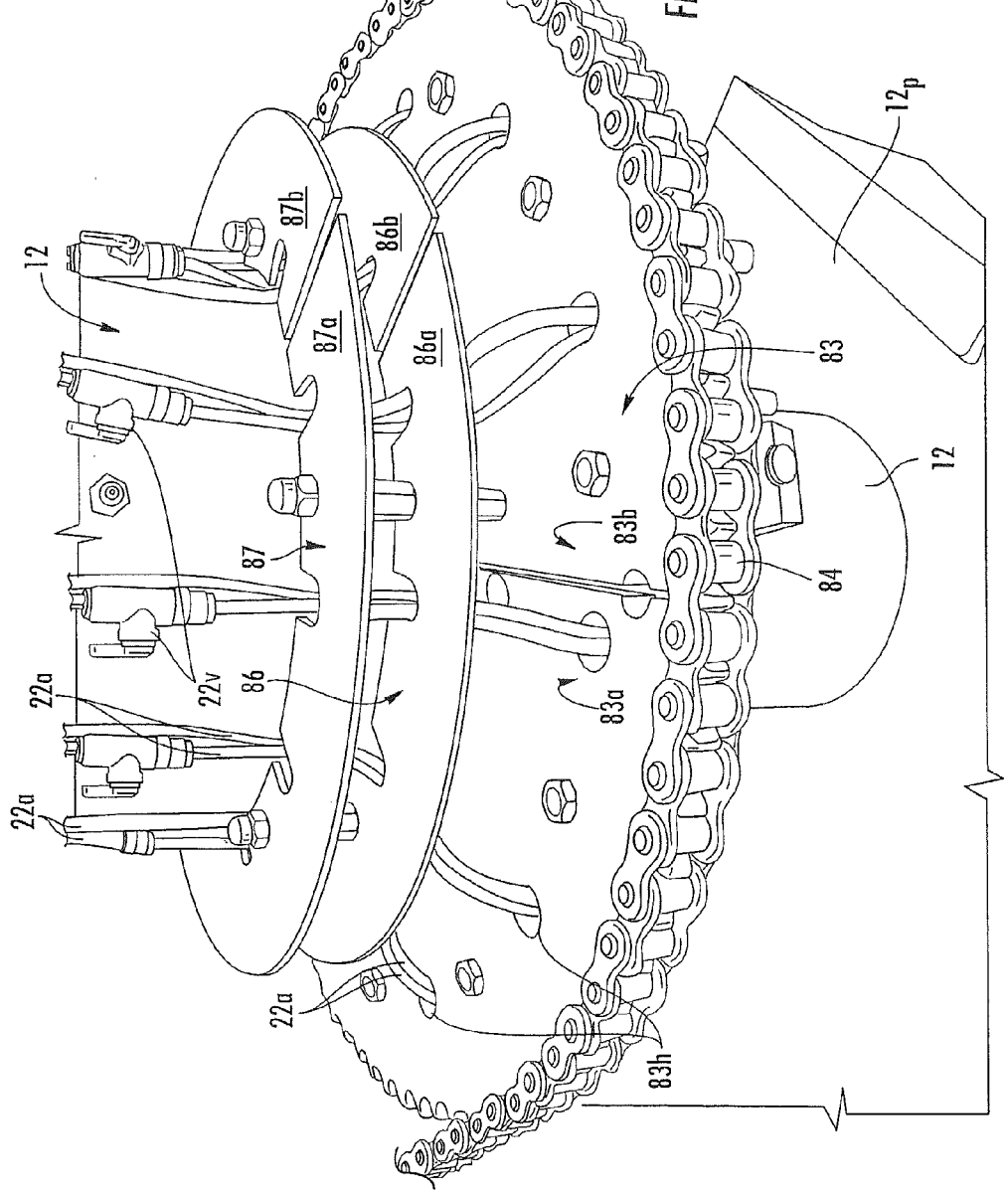
FIG. 12 is a view from below the platform level of the system shown in FIG. 1, illustrating the vertical support for the rotating platform held in communication with the split sprocket and stacked split support plates that allows ease of replacement of the sprocket without requiring disassembly of the vertical support according to embodiments of the present invention.

FIG. 12 shows that the sprocket 83 can be a split sprocket. The split sprocket 83 is typically in two equal pieces 83*a*, 83*b*, but may be in more than two pieces and may not be symmetrically split. The sprocket 83 can also include spaced apart holes apertures 83*h* that direct the airlines 22*a* from each clip station 22 beneath the sprocket 83. The table (vertical) support stand or leg 12 rotates in response to rotation of the sprocket 83, driven by the chain drive 84 and drive system (e.g., motor). The stacked vertically spaced apart (support) plates 86, 87 can reside proximate the sprocket 83 and may also be split plates 87*a*, 87*b*, 86*a*, 86*b*, respectively, to allow for ease of repair without requiring disassembly of the vertical stand 12 to remove the sprocket 83. The split line of the support plates 86, 87 can be aligned, as shown, or offset. The split line of the support plates 86, 87 may be offset with the split line of the sprocket 83 as shown or may be aligned (not shown). A suitable split sprocket is available from Martin Sprocket and Gears, Inc., located in Mansfield, Tex.

Figure 13:
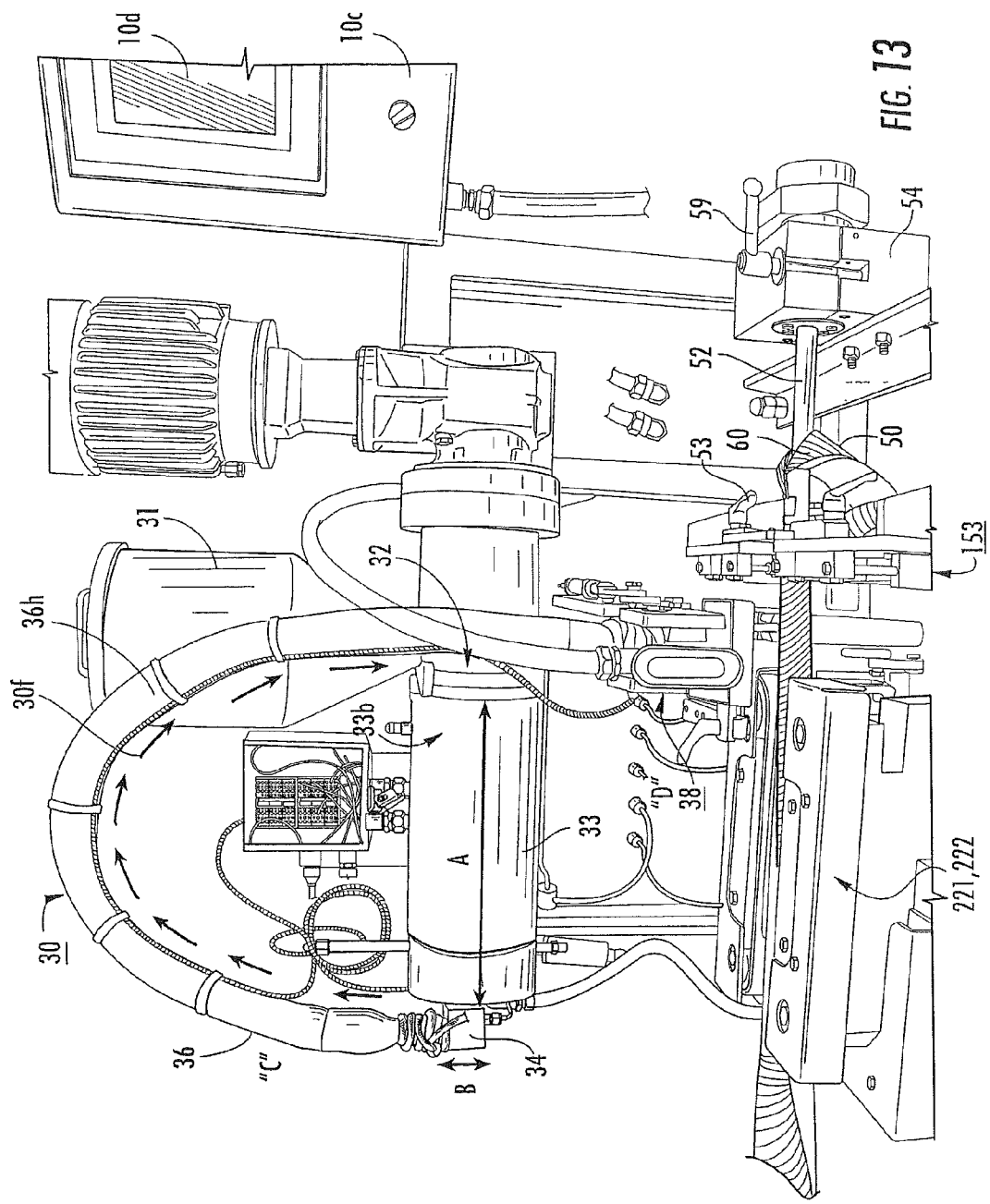
FIG. 13 illustrates an adhesive module/system with a multi-heat zone adhesive flow path with a horizontal extruder and a curvilinear flexible pipe that supplies hot fluid adhesive to the output port or nozzle according to embodiments of the present invention.
Figure 14:
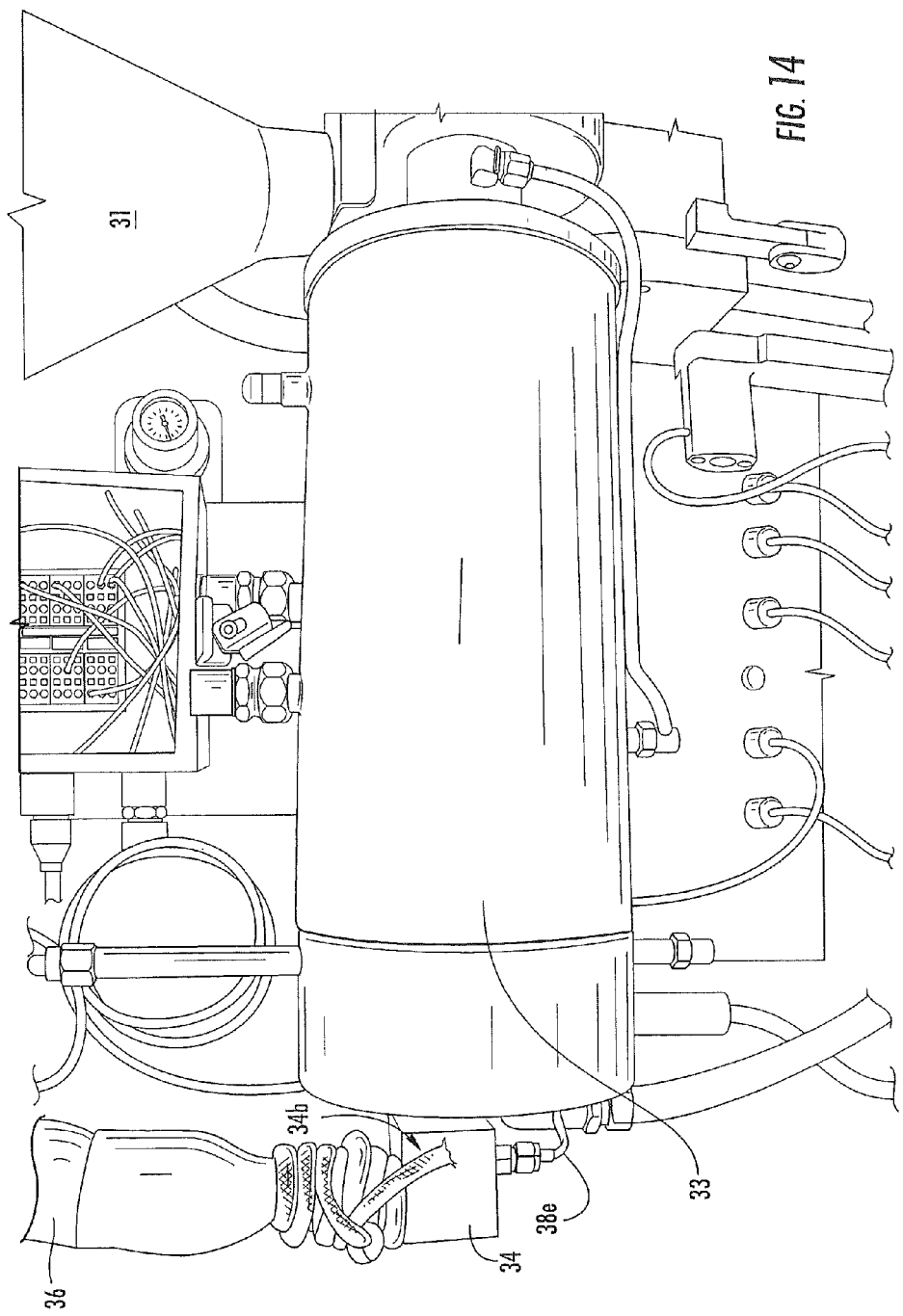
FIG. 14 is an enlarged partial front view of the system shown in FIG. 13.
Figure 15:
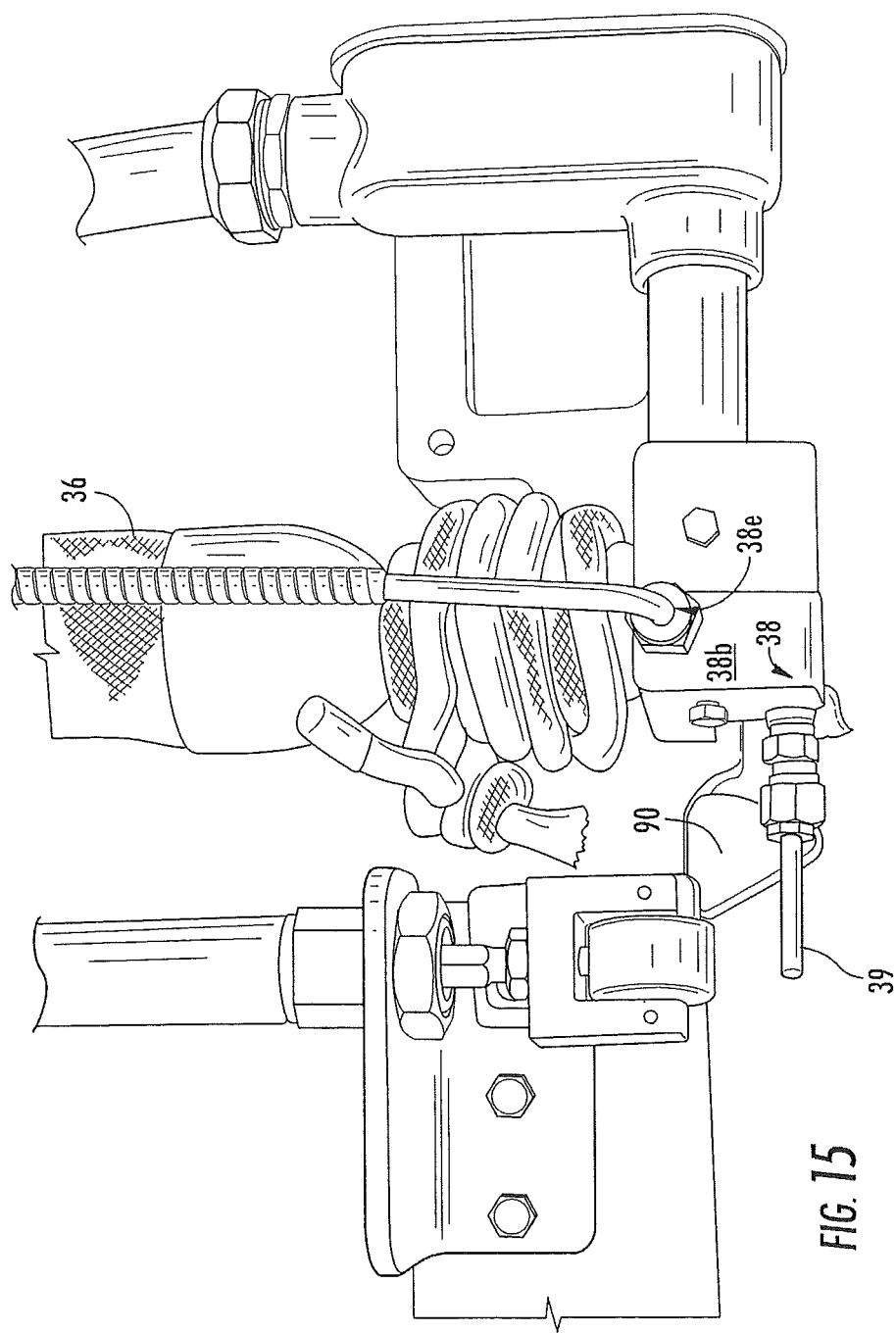
FIG. 15 is an enlarged view of the discharge end portion of the adhesive flow path shown in FIG. 13 according to embodiments of the present invention.
Figure 16:
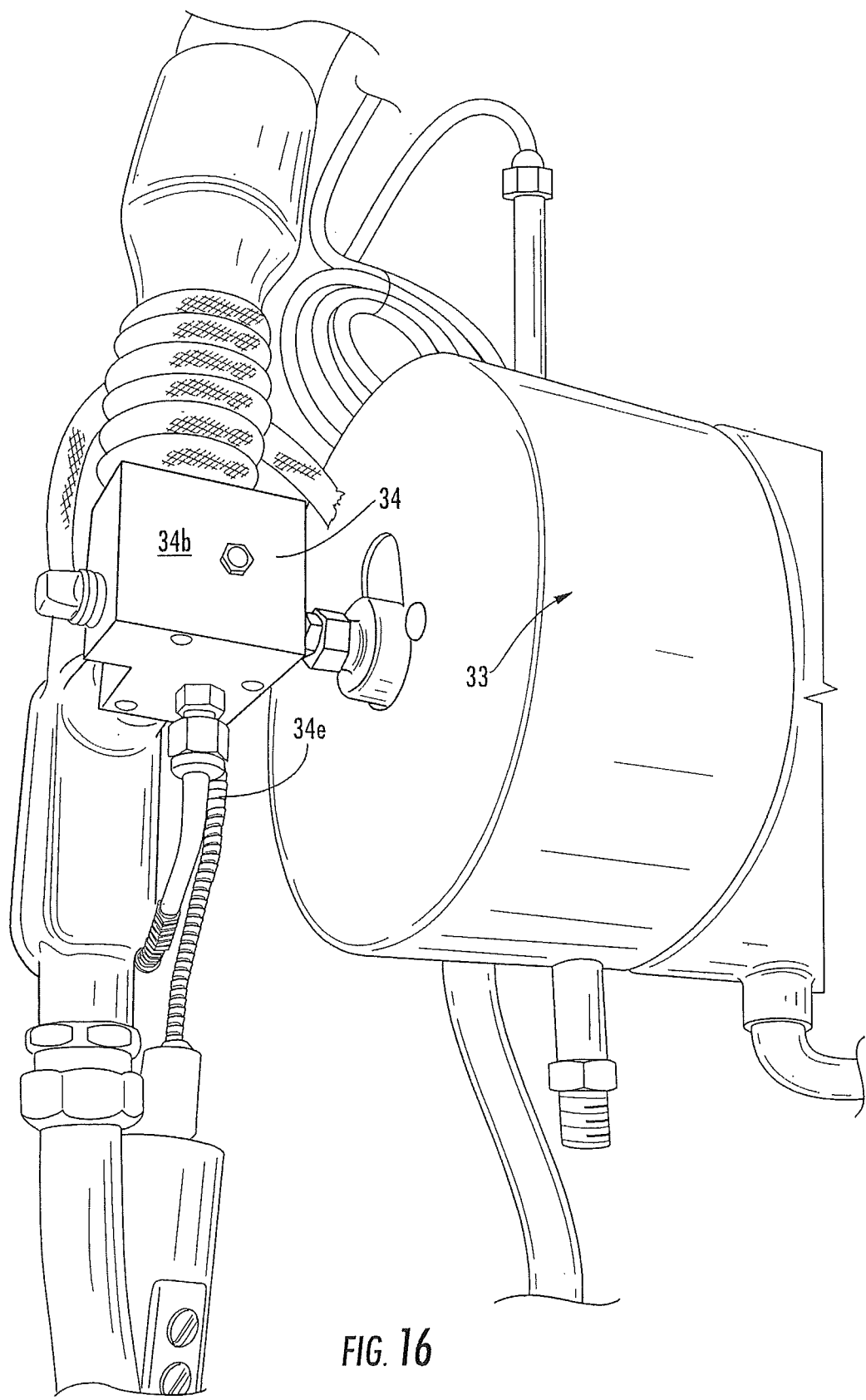
FIG. 16 is an enlarged view of a heated end block proximate the discharge end of the extruder according to embodiments of the present invention.

FIG. 13 illustrates the fluid adhesive system 30 with an associated adhesive flow path 30*f*. The flow path 30*f* has a substantially horizontal first portion associated with the (horizontal) extruder 33, which merges into a curvilinear portion associated with a conduit, pipe or hose 36 that travels up, then down to a delivery head or nozzle 39 (FIG. 15). The extruder 33 can be stationary and horizontally oriented which may improve resin feeding from the hopper 31 into the extruder 33 relative to a conventionally used vertical extruder. The conduit, pipe or hose 36 has a lower end proximate the nozzle 39 that is able to move substantially vertically between about 3-6 inches, typically between about 4-5 inches (down for application or dispensing of the adhesive from the nozzle 39 and up in a rest configuration).

The heat seal module or system with the fluid adhesive delivery system 30 can include at least four separately controllable heat zones, shown as "A, B, C, D" in FIG. 13. Individual control allows the system 10 to electronically monitor and to set different (or the same) temperatures at each zone A-D. Zone A is associated with the barrel 33*b* of the extruder, which includes at least one internal heater, typically two internal heaters. Zone B is associated with the end fitting or exit block 34 proximate the discharge end of the extruder 33. Zone C is associated with the curvilinear conduit 36 (the conduit can be a hose and/or pipe). Zone D is associated with the end fitting 38 proximate the lower portion of the conduit 36. The end fittings 34, 38 can include heat blocks 34*b*, 38*b* with a respective heat element attached thereto. The heat blocks can heat conductively based on the heat input through the thermal elements 34*e*, 38*e*, respectively. The heat blocks 34*b*, 38*b* can be metallic such as SST or brass. As also shown, ropes or other fastening or insulating members can be wrapped around the end portions of the conduit 36 proximate the heater blocks/end fittings for further structural and/or insulation reinforcement. As shown, rope is looped around the end fittings.

The conduit 36 can comprise a blanket heater 36*h* that is configured to provide the desired wattage and is overwrapped with at least one insulation layer, typically comprising Nomex®-fiberglass fibers, but other insulation materials may be used. As shown, the conduit 36 can include an outer elastomeric sleeve. The conduit 36 can also include an internal steel or SST tube or other material that defines the inner wall that contacts the flowable adhesive, which may be surrounded with a SST mesh for improving burst pressure (the SST mesh can reside under the insulation layer(s)). Examples of suitable flexible heated hoses include those available from Diebolt and Company, located in Old Lyme, Conn. or Conrad Company, located in Columbus, Ohio. The conduit 36 can have a length between about 10-80 inches. In the embodiment shown, the conduit 36 has a length of about 48 inches.

Each of the heaters can be configured to heat the adhesive to or above the melt point, typically between about 200-300 degrees Celsius. All the zones can be heated to the same temperature (typically between about 200-300 degrees Celsius) or each zone can be heated to a different temperature to promote the flow of the adhesive. In some embodiments, the blocks 34*b*, 38*b* may have a higher target temperature than the extruder 33.

The heater 38*e* proximate the nozzle 39 can be configured to operate at a higher temperature, particularly at start-up (and/or shut down) to provide a self-clearing or self-cleaning nozzle. This is in contrast to conventional systems where operators were required to use a blow-torch or other cleaning method after removing the nozzle from the device to reconfigure the nozzle to be ready for subsequent use. The cleaning or clearing temperature can be set to about 225-300 degrees Celsius. The cleaning or clearing operation can be automatically initiated upon start-up of the system 10, upon activation of the extruder 33 and/or by an operator selectable input on the controller or other suitable switch. The temperature of the lower heater zone D can be reduced from the cleaning or clearing temperature once the adhesive flows suitably from the nozzle 39. The temperature reduction can be automatic after a defined time or self-cleaning period.

As shown, the system 10 includes a vertically oriented hopper 31 that holds bulk adhesive material, typically in solid pellet, crystal or granule form. The adhesive pellets can comprise a polymer such as, for example, HDPE. The hopper 31 feeds the raw material to a horizontally extending screw extruder 33 that includes a barrel 33b in communication with a screw auger. As shown, the extruder 33 is stationary and fixed in position. As discussed above, the barrel 33b includes at least one heater, typically two internal heaters, to melt the pellets or other source adhesive material into a flowable form.

The fluid flow system can comprise a pressure sensor that senses the pressure in the extruder barrel 33b. The pressure limit can be configured to ensure that the downstream pipe or hose is not over-pressured; typically the pressure limit is set to about 1500 psi and the system 10 and/or the adhesive system 30 can be automatically shut down if this pressure is exceeded. A suitable commercially available extruder is a ¾ inch screw extruder from Killion Extruders, located in Cedar Grove, N.J. A keyway or groove can be bored or formed into the inner diameter of the extruder feed section (at about "6:00 o'clock" opposite the infeed of the hopper) to promote flowability of the pellets into the extruder 33 without over driving the motor.

The nozzle 39 can be configured to emit a plurality of strips of adhesive onto the surface of the film/covering (60, FIG. 21), typically three strips.

Figure 17A:
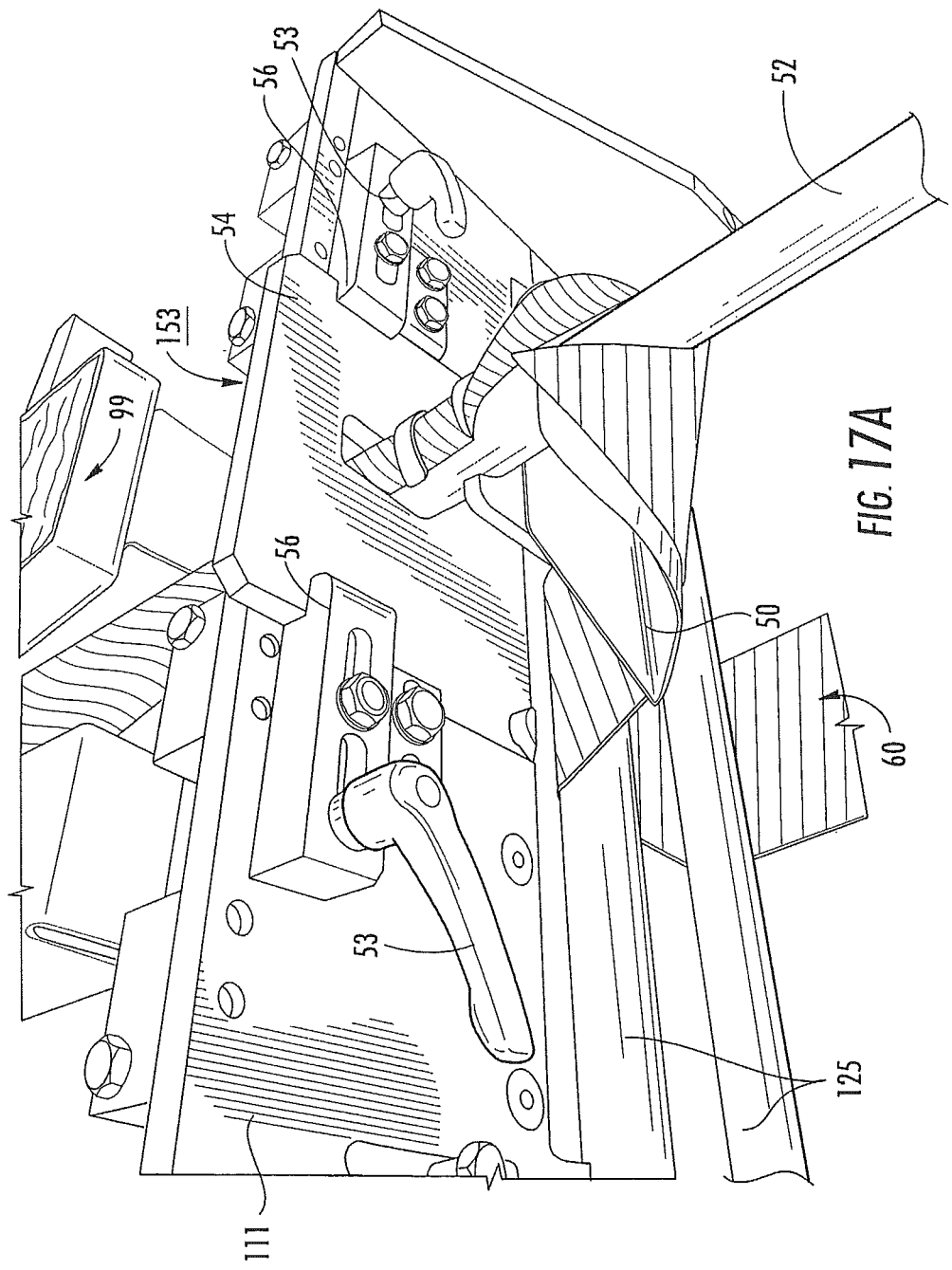
FIG. 17A is a partial end perspective view of the forming collar and horn with a tool-less mounting configuration according to embodiments of the present invention.
Figure 17B:
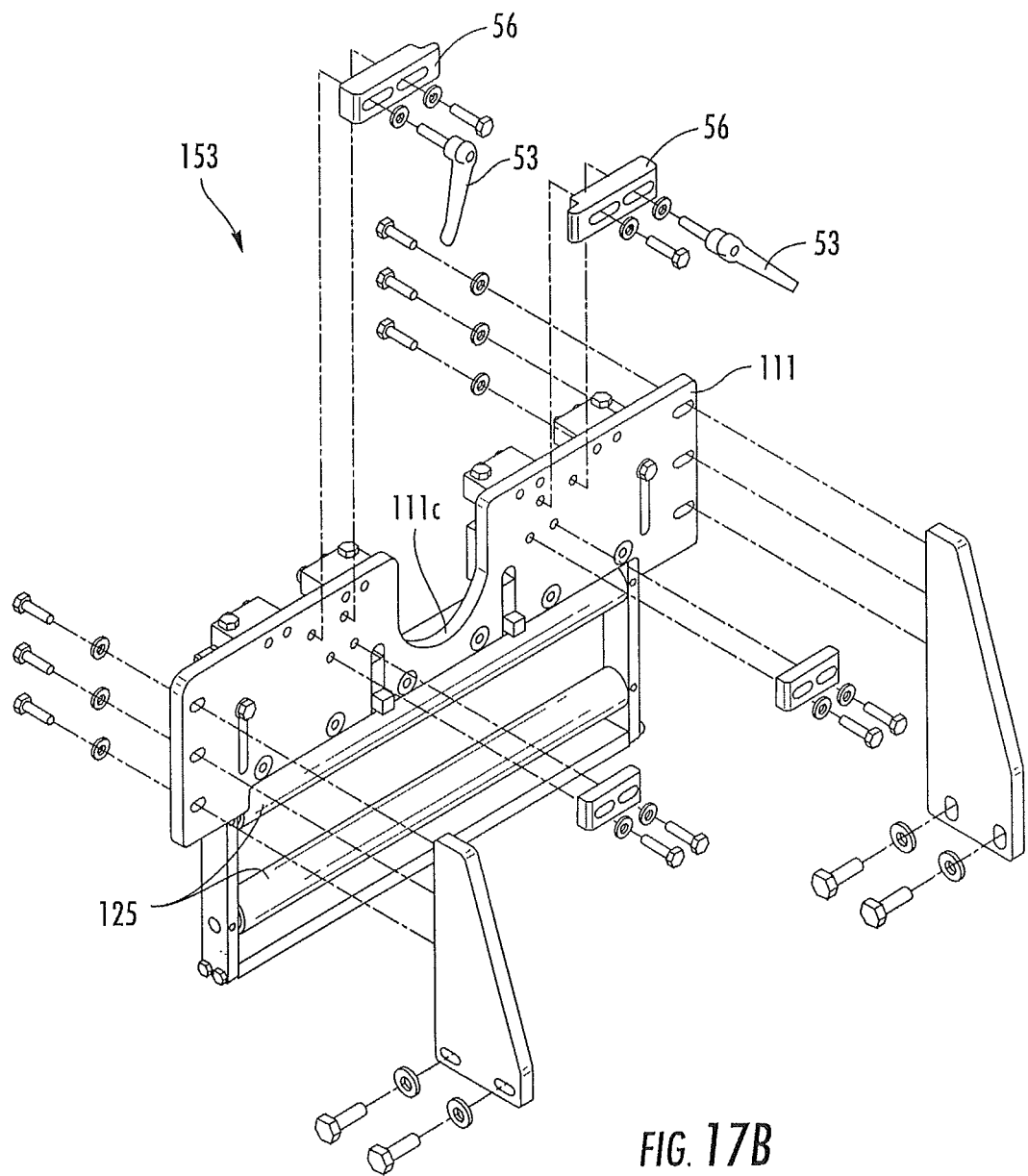
FIG. 17B is an exploded view of the tool-less forming shoulder support assembly according to embodiments of the present invention.

FIGS. 17A and 17B illustrate that the system 10 can include a tool-less/tool-free mounting configuration 153 for releasably attaching the forming collar 50 and horn 52 to the frame 10f. As shown, two rotating handles 53 can be used to both lock and release a substantially planar vertically oriented mounting plate 54 in axial position on a forming shoulder plate 111 attached to the system frame 10f and holding two web guide idler rollers 125. Once the horn 52 is in position in the cavity of the shoulder plate 111c, the horn 52 and collar 50 can be easily locked into position by turning the handles 53 to force the compression members 56 toward each other and against the plate 54. To release, the handles 53 can be turned the other way to release the holding force of the members 56, allowing a user to be able to remove the horn/collar 52/50 without requiring any tools. The compression members 56 can be configured so that one resides on each side of the cavity 111c. The compression members 56 can comprise a forming collar clamp block that cooperates with a respective handle 53.

As discussed above, the system 10 includes a horn 52 which cooperates with forming and sealing mechanisms to convert flat roll stock material 60 into substantially tubular seamed covering/casing as the material travels over the forming collar 50. The horn 52 includes an internal flow channel that extends through the horn 52. In operation, the flow channel directs product to flow therethrough (sealed from the environment). As the product exits the discharge end of the horn 52, it is stuffed into or fills the sealed casing material 60 that is held around the outer surface of the horn 52. The horn 52 can be positioned in the apparatus 10 on support structures 10f so that it is substantially horizontal with the centerline aligned with upstream and downstream components during operation.

Figure 18A:
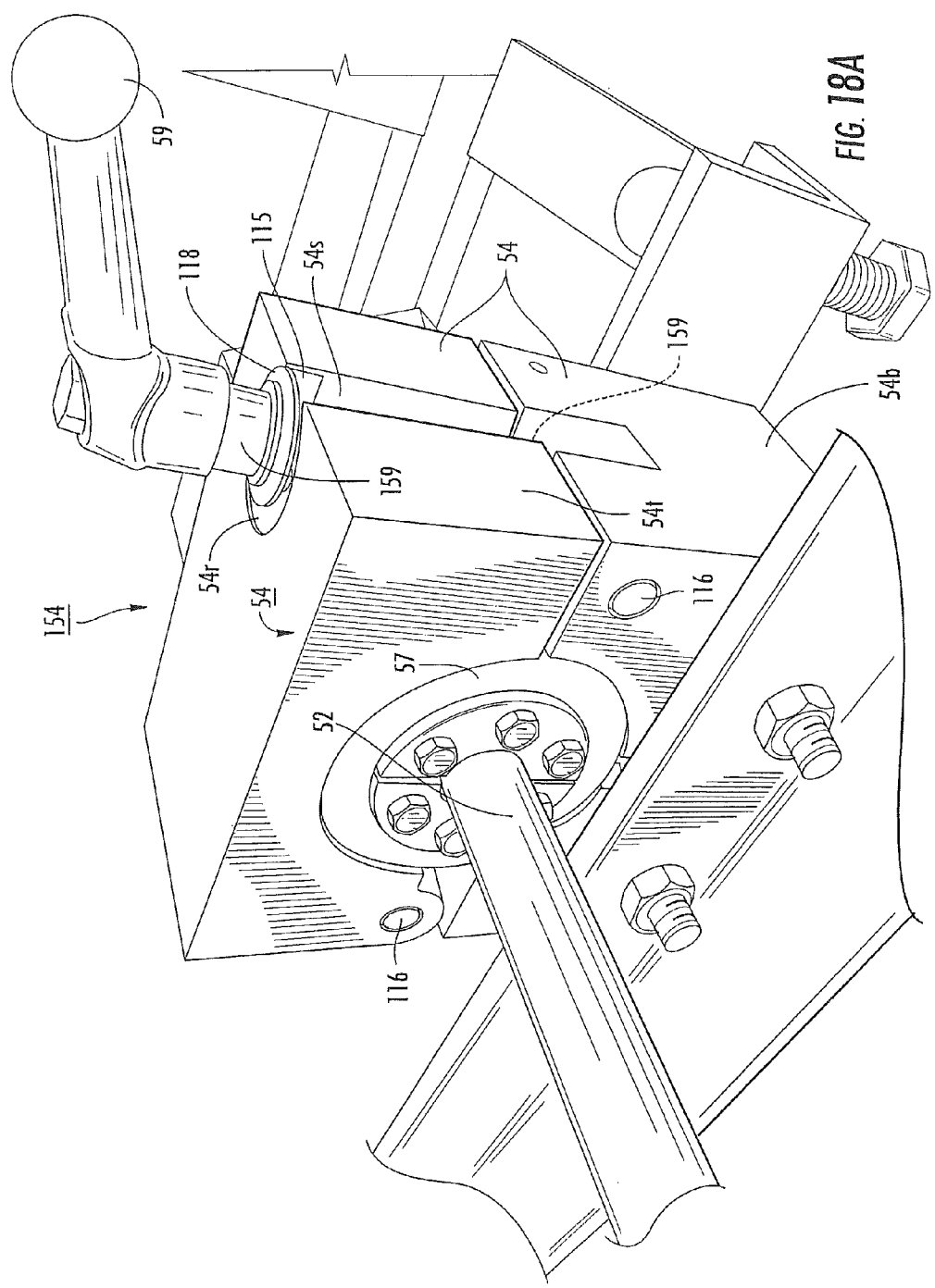
FIG. 18A is an end perspective view of a tool-less releasable horn mounting configuration according to embodiments of the present invention.
Figure 18B:
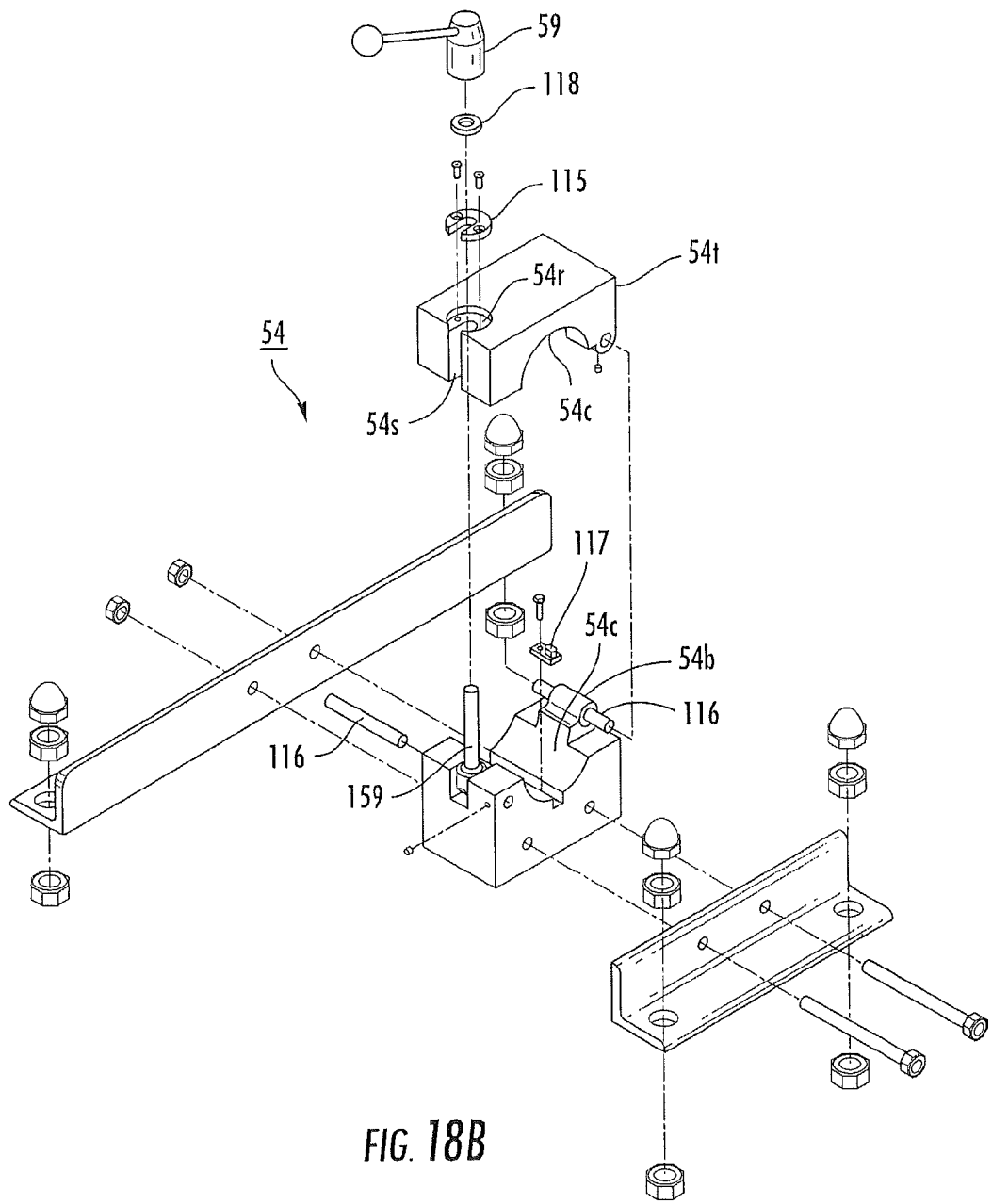
FIG. 18B is an exploded view of the tool-less horn mount assembly according to embodiments of the present invention.
Figure 19:
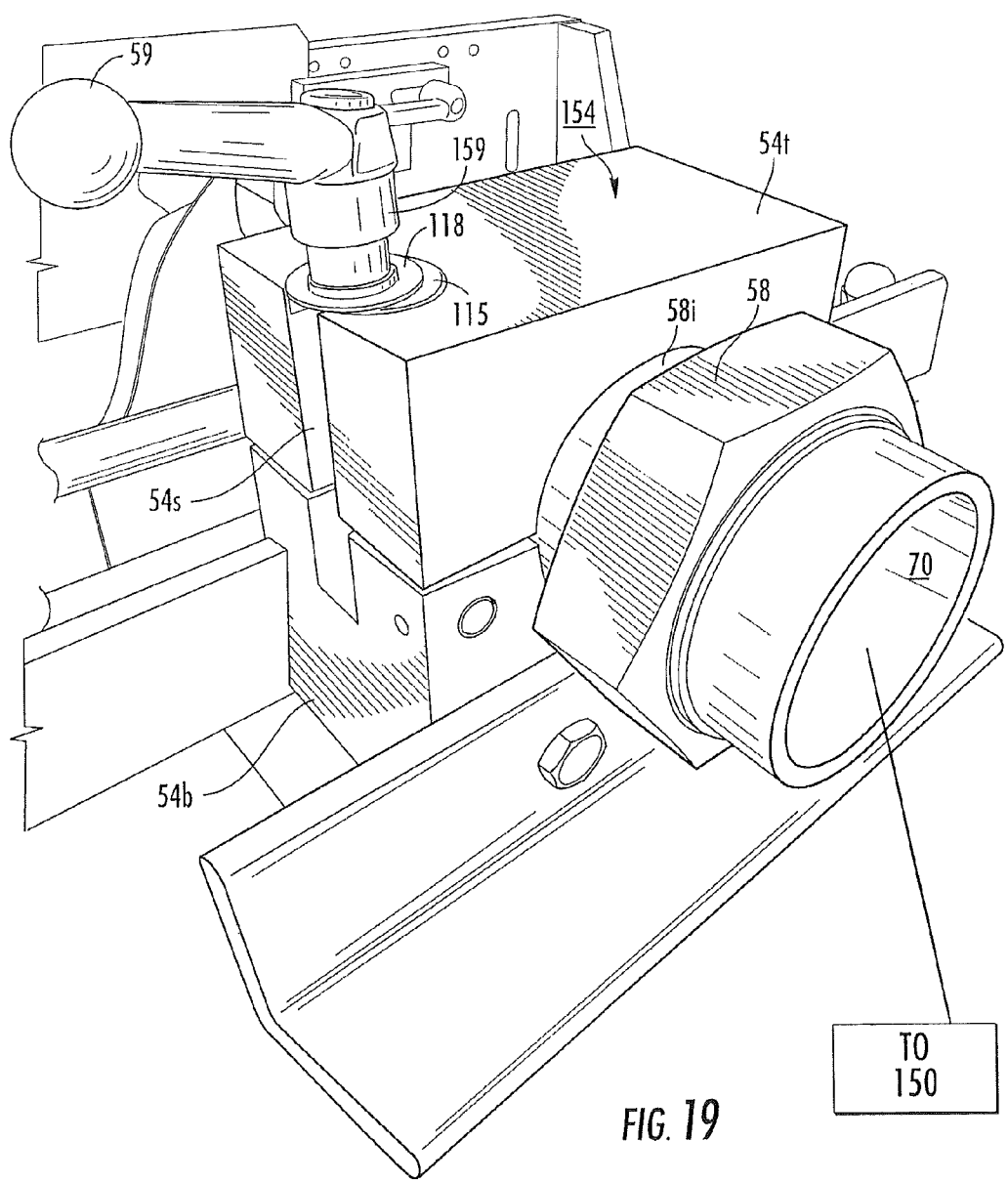
FIG. 19 is an end perspective view of the opposite side of the horn mount assembly shown in FIG. 18A according to embodiments of the present invention.

Referring to FIGS. 18A, 18B and 19, the horn 52 is in fluid communication with a filler/product pump and supply 150 located upstream thereof as shown schematically in FIG. 19. The horn 52 can terminate into a metal mounting collar 57 that engages a tool-less mounting assembly 154 located upstream of the forming collar proximate the pump outlet block 54 configured to seal the collar 57 to the pump interface 58i of the pump pipe 58. The tool-less/tool-free horn mount assembly 154 can include a handle 59 on a top portion of the block 54 can be easily turned to lock or release the horn 52 from the system frame. The block 54 can be in two cooperating pieces, a top block 54t and a bottom block 54b which form a cylindrical cavity 54c that engages the horn 52. The top and bottom blocks 54t, 54b can include a vertical slot 54s that hold a clamp screw 159 that is attached to the handle 59. The assembly may also include a flat washer 118 and a thrust washer 115 that reside in or proximate a recess 54r in the top block 54t. The tool-less horn mount assembly 154 may include two dowel pins 116, one on each side of the block 54, typically residing at a top portion of the lower block 54b. The assembly 154 may also include a fill horn key 117.

Figure 20:
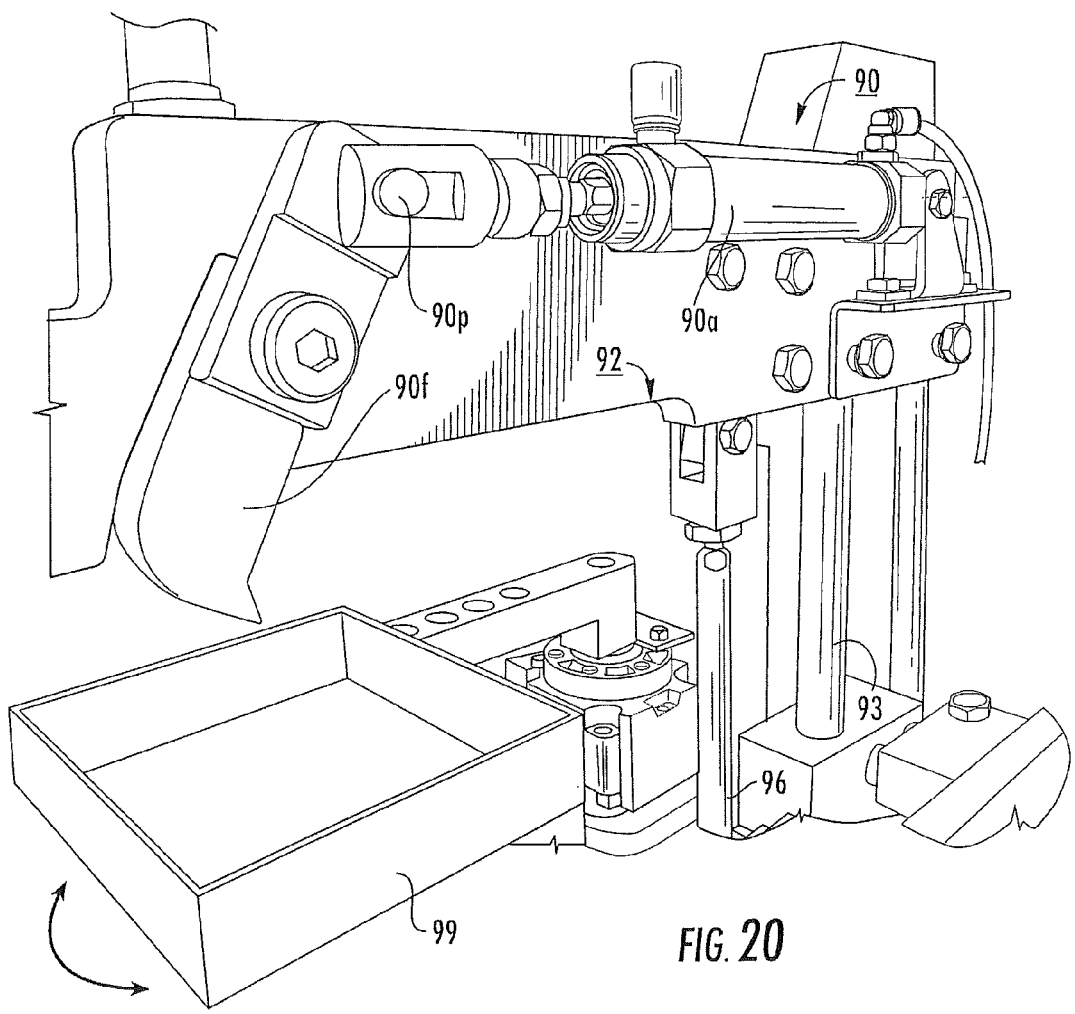
FIG. 20 is a side view of an automated film/covering lifter according to embodiments of the present invention.

FIGS. 20-22 illustrate an automated lifting mechanism for lifting one long edge portion of the covering (e.g., film) to allow the adhesive delivery nozzle 39 (FIG. 15) to advance between the upper and lower layers of overlying covering 60, particularly to flip or lift the top layer 62 up proximate in time to when the conduit 36 and nozzle 39 are lowered to an active dispensing position and the adhesive catch tray 99 (FIG. 20) is also automatically rotated out from under the nozzle 39 in concert with the lowering of the lifting mechanism and/or lowering of the conduit 36 into a dispensing mode. As shown, the lifting mechanism 90 includes a pivoting finger 90f that is pivotably attached to a laterally extending mounting member 92 via pivot 90p and is attached to a linear actuator 90a. The mounting member 92 can be configured to slide on a vertical support member (e.g., tube) 93 between extended and retracted configurations. As shown, the mounting member 92 is also attached to a vertically extending actuator 96 that causes the member to slide up to the rest or home position and down to the operative position on a member 93.

In operation, the mounting member 92 slides down the vertical support member 93 as the actuator 96 retracts and the actuator 90a extends, causing the finger 90f to rotate down and inward toward the covering 60, then lift the covering and retract during a short cycle time. Typically, the finger 90f rotates forward and lifts and/or flips the top covering 62, then rotates back within less than about 5 seconds, typically in less than about 1-2 seconds. When the actuator 90a retracts, the finger rotates away from the covering 60. The member 92 can remain lowered during dispensing but the finger 90f is retracted. FIGS. 20 and 22 show the lifting mechanism 90 in a rest position while FIG. 21 illustrates the lifting mechanism 90 lowered and the tray 99 rotated, but with the finger 90f already actuated and retracted with the nozzle 39 between the layers 60, 62. The system 10 can include a user input button (e.g., touchscreen on an operator control display or button or switch) to allow an operator to "refire" or extend the finger 90f as needed.

The system 10 can include a Siemens variable frequency drive and integral safety system, including, for example, a Siemens Step7 300 Processor with Integral Safety Systems, including a Siemens touch screen, motor drives and safety modules. The touch screen can include a series of iconic and/or pictorial image display of user-activated or status indicating features for various components, e.g., adhesive nozzle down, pump "on or off" and the like. The electric motors can be explosion-proof TECO motors that can be mounted outside the electrical box to reduce or eliminate cooling issues. The system can include automatic positioning of vacuum belt drives. The system 10 can be Ethernet ready for remote access via VPN and may also be PROFIBUS ready, foreign language supported.

In some embodiments, the system 10 can be configured to operate with an automated synchronized drive control system that may use a single virtual axis for ramp-up to maximum operational speed that synchronizes the covering (e.g., film) drive, the adhesive extruder drive and the rotating table drive (using the Siemens or a similar variable frequency drive system). Each drive system can operate at a selected (variable or constant) speed. The film and extrusion drive can operate to provide sealed tubular covering at any desired speed, including between about 10-300 feet per minute, typically between about 150-300 feet/min; more typically, the machine can operate at an operating speed of about 300 feet/minute.

Figure 23A:
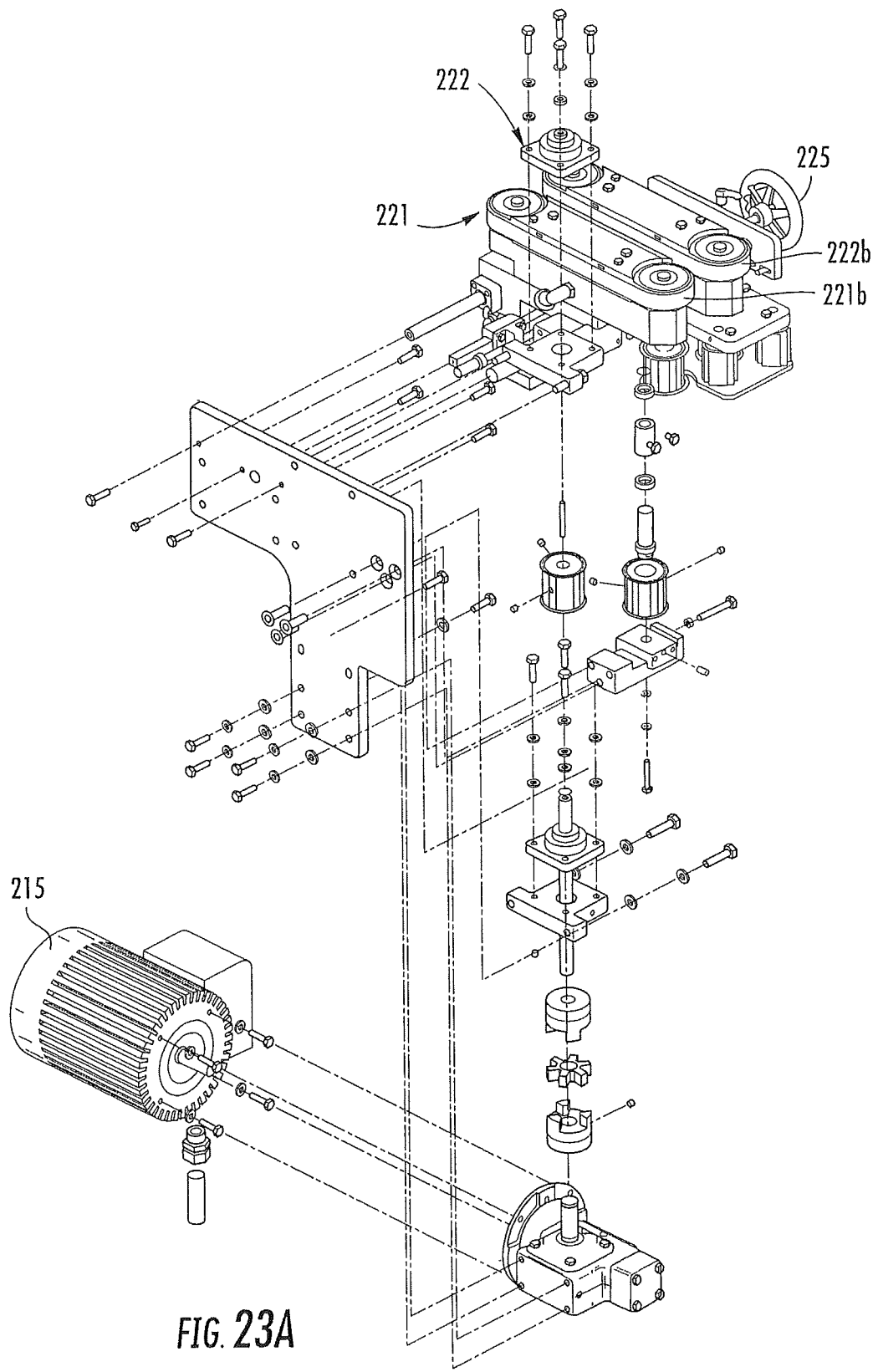
FIG. 23A is an exploded view of a film drive assembly that includes a primary belt that is in communication with front and rear vacuum drives according to embodiments of the present invention.
Figure 23B:
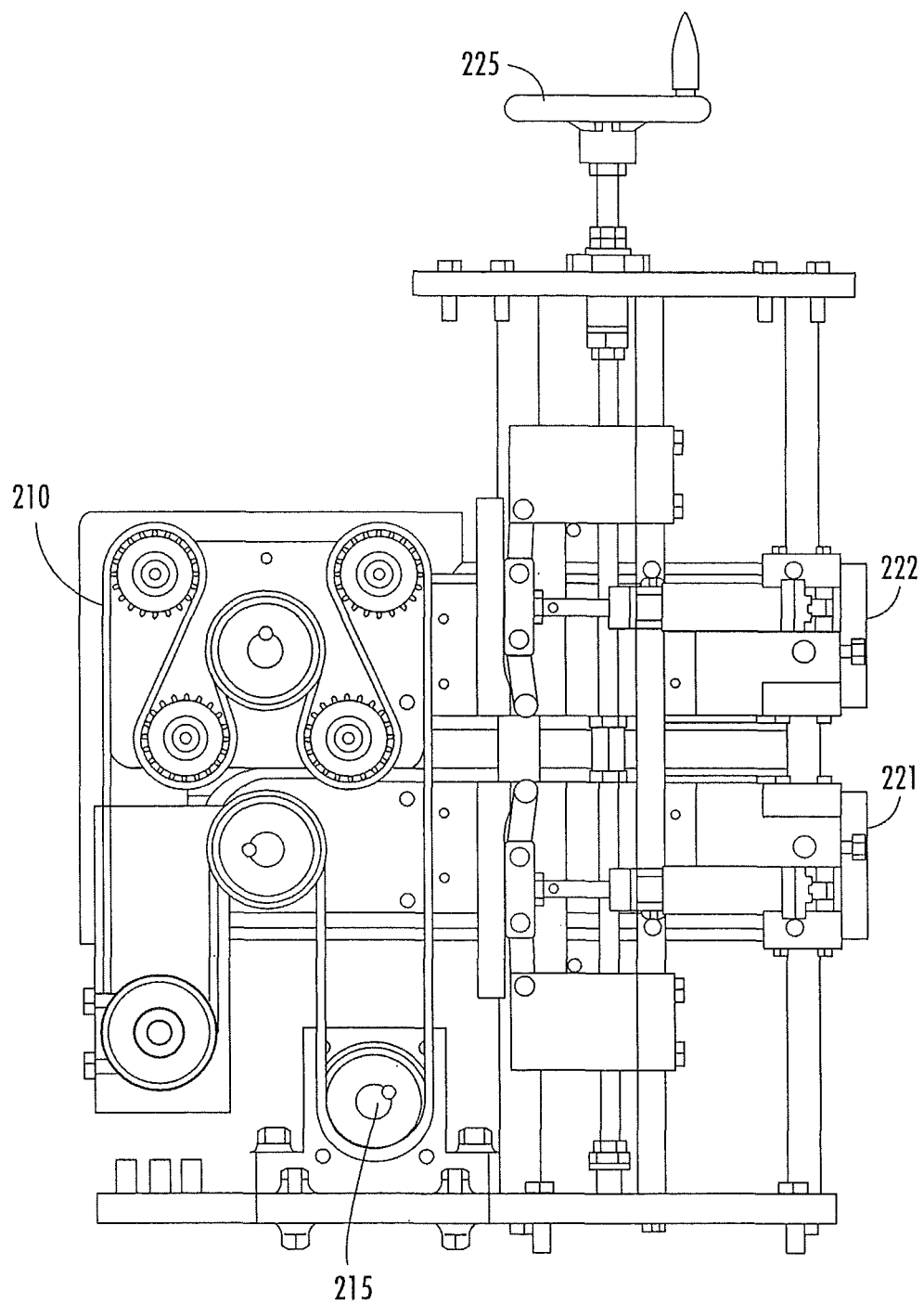
FIG. 23B is a bottom assembled view of the film drive assembly shown in FIG. 23A.

FIGS. 23A and 23B illustrate an example of a film drive assembly 200 which drives the film 60 (or other covering) that forms the tubular casing or covering. As shown, there is a belt 210 that is driven by an electric motor 215 which drives both vacuum belt drives 221, 222.

In a typical sequence of events, the forming collar 50 is placed into position on the horn 52 by sliding the product horn 52 through the forming collar 50. The forming collar 50 and product horn 52 are then placed into position into the tool-less less forming shoulder support assembly 153 (FIGS. 17A, 17B). Once the forming collar 50 is in place, the product horn 52 can be clamped into position using the tool-less horn mount assembly 154 (FIGS. 18A, 18B). The horn 52 is clamped, aligning it into position via the vertical pin 159 in the assembly 154 (FIG. 18B).

Referring again to FIGS. 23A and 23B, the film drive assembly 200 has an adjustment wheel 225 which moves both sets of the vacuum belt drives 221, 222 (together) toward the front or back of the machine. This action allows the front and back vacuum belt drives to be aligned substantially equidistant to the horn 52. Once they are equal in distance from the horn 52, an input on the touchscreen 10d (FIG. 2) can be used to electronically open or close the vacuum drives 221, 222. The opening and closing are typically simultaneous.

At this point the operator is ready to load film 60. Flat roll stock film 60 is pulled through the forming collar 50 (which forms a tube around the product horn 52). It is pulled past the open vacuum belts 221, 222 down the length of the horn 52.

The system 10 can be configured with an automatic positioning using a touchscreen input on the HMI (human/machine interface) display 10d. This user-selectable input tells the vacuum belt drives rear and front 221, 222 of the film drive assembly 200, to open or close. After the film 60 is in position, the machine/system 10 is ready for operational position whereby the vacuum drives 221, 222 should be closed so that the vacuum belts 221b, 222b abut up against the film 60, clamping the film 60 between the horn 52 and the belts 221b, 222b. This can be done pneumatically with air cylinders which are associated with the vacuum belt drive assemblies 221, 222.

Figure 24:
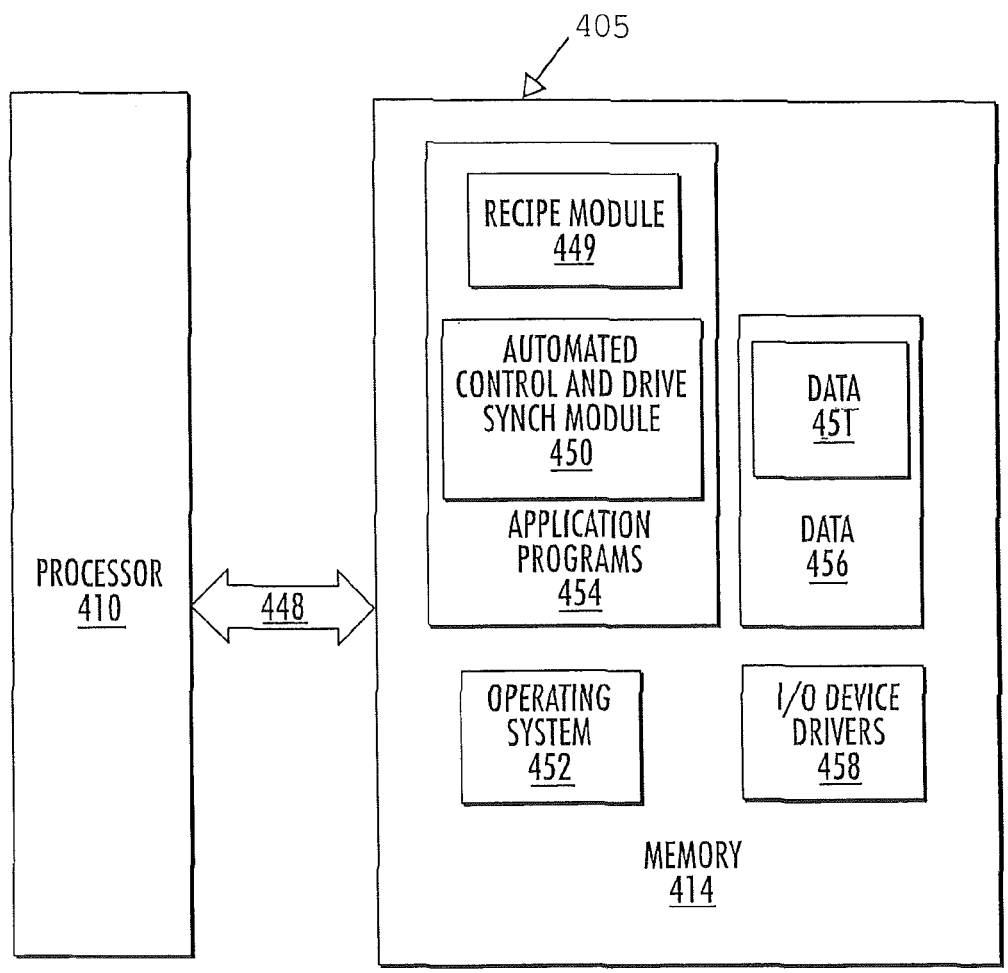
FIG. 24 is a block diagram of a data processing system according to embodiments of the present invention.

FIG. 24 is a block diagram of exemplary embodiments of data processing systems that illustrates systems, methods, and computer program products in accordance with embodiments of the present invention. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 24, the memory 414 may include several categories of software and data used in the data processing system 405: the operating system 452; the application programs 454; the input/output (I/O) device drivers 458; the Automated Control and Drive Module 450 and/or Recipe Module 449; and the data 456.

The data 456 may include a look-up chart of different "recipes" as well as the associated drive speeds, clipper and table position set-up information, and the like, corresponding to particular or target products for one or more producers. The data 456 may include temperature zone monitoring data to automatically control the temperature in each zone and a synchronized drive module for synchronizing the drive speeds of the different cooperating systems, e.g., film drive system, the table rotation drive system, the extruding speed, pump speed, and the like. The speed of the film/covering 60 or rotation speed of the table 20 and the like can be adjusted based on real-time feedback of the operative status of the machine such as from the tension/force feedback from the dancer arm discussed above with respect to FIG. 3. Selection of all, groups and/or individual clippers 22 can be automated based on the "recipe" to activate or deactivate certain clippers at different (typically alternating) clipper stations, e.g., stations 1-12.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components and/or the dispensing system 420. The application programs 454 are illustrative of the programs that implement the various features of the data processing system 405 and preferably include at least one application which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Modules 449, 450 being an application program in FIG. 24, as will be appreciated by those of skill in the art, other configurations may also be utilized while still benefiting from the teachings of the present invention. For example, the Modules 449, 450 may also be incorporated into the operating system 452, the I/O device drivers 458 or other such logical division of the data processing system 405. Thus, the present invention should not be construed as limited to the configuration of FIG. 24, which is intended to encompass any configuration capable of carrying out the operations described herein.

The I/O data port can be used to transfer information between the data processing system 405 and the downstream clippers or another computer system or a network (e.g., the Internet or Ethernet) or to other devices controlled by the processor. These components may be conventional components such as those used in many conventional data processing systems which may be configured in accordance with the present invention to operate as described herein.

While the present invention is illustrated, for example, with reference to particular divisions of programs, functions and memories, the present invention should not be construed as limited to such logical divisions. Thus, the present invention should not be construed as limited to the configuration of FIG. 24 but is intended to encompass any configuration capable of carrying out the operations described herein.

The operation and sequence of events and can be controlled by a programmable logic controller (PLC). The operational mode and certain input parameters or machine controls can be selected or controlled by an operator input using a Human Machine Interface (HMI) to communicate with the controller as is well known to those of skill in the art.

The block diagram illustrates the architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In summary, embodiments of the present invention provide apparatus, systems, devices, methods and computer program products configured to provide one or more of the following features or components: rotating tables with at multiple clippers, typically at least 10, and more typically about 12, circumferentially spaced apart (providing conformance with industry-standard product lengths with minimal or reduced waste); improved flowable adhesive seal systems; clip spool cradles with easy load and release systems; horizontal (typically stationary) extruders in cooperation with curvilinear flow paths and horizontal fill configurations; automated casing (e.g., film) lift members for nozzle insertion between overlapping layers of the casing; an automated table longitude position adjustor extender and retractor; rotary support tables with fine radial clipper location/position adjustments; self-cleaning or self-clearing systems for adhesive delivery nozzles; automated parameter (recipe-specific) position adjustment and displayed set-up data for operators; cooperating clip guide bars with aperture patterns and guide slots that mount to the rotating table and cooperate with clipper guides that hold dual clippers to lock and position the clipper in multiple different radial positions; at least four discrete temperature controlled heat zones in the adhesive fluid flow path; a rotating table with improved air supply and air preparation units for actuation that can operate with interchangeable size clippers and associated clips to provide improved speed or the same operational output (e.g., 300 pieces per minute) irrespective of the clipper used; tool-free releasable mounting of the horn and forming collar; an automated sprocket lubricator sprayer system; automated controls to synchronize the different drive systems of the overall system to cooperate at appropriate speeds, including the synchronization of the film drive, adhesive extruder, and the rotating table drive; an automated drive system speed adjustment based on force exerted against a dancer arm positioned between the table or platform and downstream of the horn and in communication with the tensioned filled film; a split sprocket and split overlying supports positioned about the vertical table mount leg for easier replacement of the sprocket without requiring disassembly of the table/platform; a tool-less releasable horn collar and block that defines a pump interface mounting configuration, and automatic positioning of the vacuum belt drives.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A packaging system comprising:
    a rotating platform having a vertical column;
    a plurality of circumferentially spaced apart clippers mounted to the rotating platform; and
    a plurality of circumferentially spaced apart top load, drop-in spool cradles, each cradle having two side-by-side cradle cavities with a pivoting handle residing therebetween that can pivot up and down for releasably holding spools of clips to be in communication with respective clippers on the rotating platform.

2. The system of claim 1, wherein the cradles have first and second outer side support members and laterally extending inner and outer support members that extend across and attach to end portions of the side support members, wherein a respective clip spool resides in a corresponding one of the cradle cavities to reside against the laterally extending inner and outer members and one of the first and second outer side support members.

3. The system of claim 1, wherein the handle has an upper portion that has a length sufficient to snugly contact an upper portion of each adjacent wall of two spools that are in the cavities of a respective cradle.

4. The system of claim 1, wherein the pivoting handle has a substantially T shaped configuration with a long downwardly extending center portion that resides between the two cradle cavities and an upper cross portion that resides over top edge portions of spool cases holding clips therein.

5. The system of claim 1, further comprising a spring attached to an upper portion of the long center portion and a lower center portion of a respective cradle.

6. The system of claim 1, further comprising a split main drive sprocket having at least two adjacent aligned horizontal pieces with at least two spaced apart radially extending split lines residing under the rotating platform surrounding the vertical column; and
    a drive system in communication with the sprocket that rotates the rotating platform at a desired speed.

7. The system of claim 6, further comprising first and second vertically stacked and spaced apart horizontally oriented plates residing above and adjacent to the sprocket under the platform and configured to surround the vertical column, each of the plates being split into a plurality of adjacent pieces with a radially extending split line extending between the adjacent pieces.

8. The system of claim 1, further comprising:
a drive system in communication with the column to rotate the column at a desired speed; and
a controller in communication with the drive system and the clippers configured to control a rotating speed of the column and actuation of the clippers using a defined run mode associated with one of a plurality of predefined different electronic recipes.

9. The system of claim 1, further comprising a drive system for the vertical column, and controller in communication with the vertical column drive system and the clippers, the controller having a recipe module for different products and/or product sizes that electronically selects a corresponding clipper activation pattern and drive speed for the drive system of the vertical column for a selected product and/or product size, wherein the controller is configured to allow remote electronic access to the system.

10. The system of claim 1, wherein the clippers include on-board air conduits, the system further comprising:
a plurality of air conduits and valves residing proximate the vertical column that attach to respective clippers, that air conduits rising up from a base portion thereof to defined clipper stations holding the respective clippers;
a pressurized air supply in communication with the air conduits;
a drive system in communication with the vertical column for driving the platform a desired speed; and
a controller in communication with the valves and the drive system, the controller comprising a recipe module that defines different drive speeds and clipper activation patterns for different products and/or product sizes, and electronically directs the drive system and valves to operate according to a selected recipe.

11. The system of claim 1, further comprising a controller in communication with the rotating platform and clippers configured to programmatically provide recipe-specific operation of the clippers and a display of set-up data for operators.

12. The system of claim 1, wherein each clipper is in communication with a first air conduit that is a main air line for a trigger valve and a second air conduit that includes an in-line shut off valve that shuts off air to a gate cylinder of a respective clipper.

13. The system of claim 1, wherein the platform comprises an open radially extending gap space proximate each clipper station, wherein each side of a respective gap space of the platform comprises an upper plate and a closely spaced lower plate bounding a horizontal, radially extending slot, wherein the system includes clip-mounts, wherein each clip-mount releasably attaches to a respective clipper and has a lower portion that slides into adjacent slots of a respective clipper station to mount the clipper to the platform.

14. The system of claim 1, wherein the platform comprises an open radially extending gap space proximate each clipper station, wherein each side of a respective gap space of the platform comprises an upper plate and a closely spaced lower plate bounding a horizontal, radially extending slot, and wherein the cradle comprises a downwardly extending base residing between the two cradle cavities, each side of the base configured to slidably reside in a slot adjacent a respective gap space.

15. The system of claim 14, wherein the upper and lower plates proximate each gap space include a series of aligned apertures, the system further comprising locking members configured to extend through the apertures and hold the clip mount.

16. The system of claim 14, further comprising a fine radial adjustment member that is attached to the clipper and allows a user to controllably radially move the clipper between about 0.1 inches to about 1 inch or less while the clip mount remains engaged with the respective slot apertures to thereby set a more precise radial position for more accurate and/or reliable product lengths.

17. The packaging system of claim 1, further comprising:
a drive system with a selectable rotation speed in communication with the platform;
a film drive assembly having a film drive system in communication with a supply of flat roll stock film having a selectable speed, the film drive assembly residing upstream of the rotating platform;
an adhesive seal system in communication with the film drive system and residing upstream of the platform with the clippers, the adhesive seal system having an extruder with an extruder drive system with a selectable extrusion speed in communication with an adhesive flow path that terminates into an adhesive nozzle, wherein the adhesive seal system has temperature zones that extend between the extruder and the nozzle that can be individually electronically controlled to have a desired respective temperature; and
an automated control system in communication with the platform drive system, the film drive system and the extruder drive system, wherein the control system is configured to synchronize operation of one or more of the drive systems during operation of the packaging system to produce a desired product.

18. The system of claim 17, wherein the automated control system is configured to adjust a speed of at least one of the film and extruder drive system responsive to force exerted against a dancer arm positioned between the rotating platform and an exit portion of a product horn so as to be in communication with tensioned filled sealed covering directed over the horn.

19. The packaging system of claim 1, further comprising:
an automated control system in communication with the rotating platform; and
a sliding platform attached to the vertical column in communication with the control system, wherein the control system directs longitudinal movement of the vertical column to position the rotating platform at a desired operative location.

20. The packaging system of claim 1, further comprising:
an extruder that merges into an adhesive flow path having a plurality of electronically adjustable temperature zones, the adhesive flow path extending from the extruder to an adhesive applicator, the adhesive applicator and extruder residing upstream of the rotating platform; and
a controller in communication with the adhesive flow path temperature zones configured to (i) monitor and adjust temperatures in the different temperature zones and (ii) increase, then decrease, the temperature of the heating zone proximate the applicator to cause the applicator to perform a self-cleaning or self-clearing operation, thereby inhibiting clogging of the applicator.

21. The packaging system of claim 1, further comprising:
a product horn residing upstream of the platform;
a location sensor in communication with the rotating platform;

a rotating table position adjustment drive system with a motor;

a forming collar in communication with the horn configured to form a generally tubular film or covering from flat roll stock, wherein the horn provides product that is encased by the film or covering to the rotating table to be concurrently clipped by clippers on the rotating platform; and a controller in communication with the position adjustment drive system motor configured to programmatically automatically position the rotating platform in a desired operational position using the drive system motor and input from the location sensor.

22. The system of claim 21, wherein the controller positions the rotating table using the drive system motor and pre-defined data regarding position associated with a recipe of a product being packaged.

23. A packaging system comprising:
a rotating platform having a vertical column;
a plurality of circumferentially spaced apart clippers mounted to the rotating platform;
a split main drive sprocket having at least two adjacent aligned horizontal pieces with at least two spaced apart radially extending split lines residing under the rotating platform surrounding the vertical column; and
a drive system in communication with the sprocket that rotates the rotating platform at a desired speed.

24. The system of claim 23, further comprising first and second vertically stacked and spaced apart horizontally oriented plates residing above and adjacent to the sprocket under the platform and configured to surround the vertical column, each of the plates being split into a plurality of adjacent pieces with a radially extending split line extending between the adjacent pieces.

25. The system of claim 23, further comprising a plurality of circumferentially spaced apart top load, drop-in spool cradles, each cradle having two side-by-side cradle cavities with a pivoting handle residing therebetween that can pivot up and down for releasably holding spools of clips to be in communication with respective clippers on the rotating platform.

* * * * *